(12) United States Patent
Nakamura

(10) Patent No.: US 9,070,033 B2
(45) Date of Patent: Jun. 30, 2015

(54) STACK BARCODE READER AND STACK BARCODE READING METHOD

(71) Applicant: NIDEC SANKYO CORPORATION, Nagano (JP)

(72) Inventor: Hiroshi Nakamura, Nagano (JP)

(73) Assignee: NIDEC SANKYO CORPORATION (JP)

( * ) Notice: Subject to any disclaimer, the term of this patent is extended or adjusted under 35 U.S.C. 154(b) by 0 days.

(21) Appl. No.: 14/221,533

(22) Filed: Mar. 21, 2014

(65) Prior Publication Data

US 2014/0291402 A1    Oct. 2, 2014

(30) Foreign Application Priority Data

Mar. 28, 2013 (JP) ................................. 2013-068945

(51) Int. Cl.
*G06K 7/10* (2006.01)
*G06K 7/14* (2006.01)

(52) U.S. Cl.
CPC ............ *G06K 7/1417* (2013.01); *G06K 7/1473* (2013.01); *G06K 7/1456* (2013.01)

(58) Field of Classification Search
USPC .............. 235/462.11, 462.16, 462.01, 462.09
See application file for complete search history.

(56) References Cited

U.S. PATENT DOCUMENTS

| 5,631,457 | A | * | 5/1997 | Fukuda et al. | ............. 235/462.1 |
| 6,126,074 | A | * | 10/2000 | He et al. | ......................... 235/454 |
| 8,333,326 | B2 | * | 12/2012 | Nakamura | ............... 235/462.16 |
| 2004/0026508 | A1 | * | 2/2004 | Nakajima et al. | ............. 235/454 |
| 2009/0255992 | A1 | * | 10/2009 | Shen | ......................... 235/462.1 |

FOREIGN PATENT DOCUMENTS

JP    2012083835 A    4/2012

* cited by examiner

*Primary Examiner* — Ahshik Kim
(74) *Attorney, Agent, or Firm* — Cantor Colburn LLP

(57) ABSTRACT

A stack barcode reader may include an imaging section configured to image the stack barcode in which character information is expressed with a bar and a space; an image memory configured to store image data of the stack barcode; a data processing section including a decoding unit and configured to decode the barcode of the stack barcode into the character information. The decoding unit may include a low-level decoding unit, a high-level decoding unit, and a decoded result selection unit for selecting a decoded result. The high-level decoding unit may include an error-correction unit. The decoded result selection unit may include a counter unit configured to count the number of error corrections and a selection unit configured to select a decoded result having the less number of corrections.

2 Claims, 15 Drawing Sheets

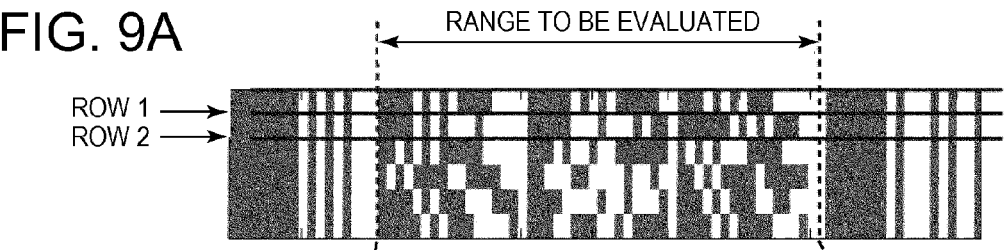
FIG. 9A
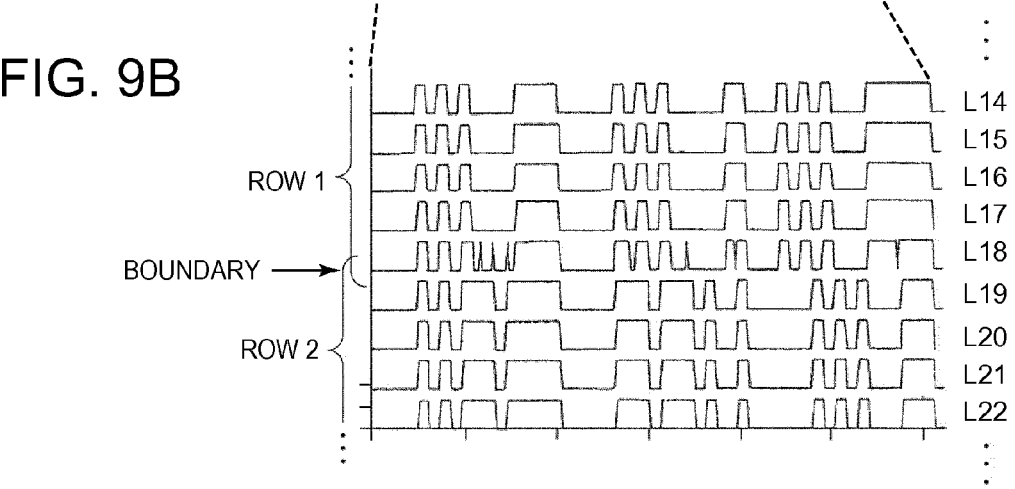
FIG. 9B
FIG. 10
| LINE GROUPS | CONSTITUENT LINES | JUDGMENT VALUES |
|---|---|---|
| S1 | L1,L2,L3 | 1 |
| ... | ... | ... |
| S15 | L15,L16,L17 | 1 |
| S16 | L16,L17,L18 | 0 |
| S17 | L17,L18,L19 | 0 |
| S18 | L18,L19,L20 | 0 |
| S19 | L19,L20,L21 | 1 |
| ... | ... | ... |
| S21 | L21,L22,L23 | 1 |
| ... | ... | ... |
| Sn-2 | Ln-2,Ln-1,Ln | 1 |

(b): FIRST DIFFERENTIATION
(c): SECONDARY DIFFERENTIATION

FIG. 19
| SAFETY PROTECTION LEVEL OF PDF417 ||
|---|---|
| SAFETY PROTECTION LEVEL | ERROR CORRECTION CODE-WORD |
| 0 | 0 |
| 1 | 2 |
| 2 | 6 |
| 3 | 14 |
| 4 | 30 |
| 5 | 62 |
| 6 | 126 |
| 7 | 254 |
| 8 | 510 |
FIG. 20
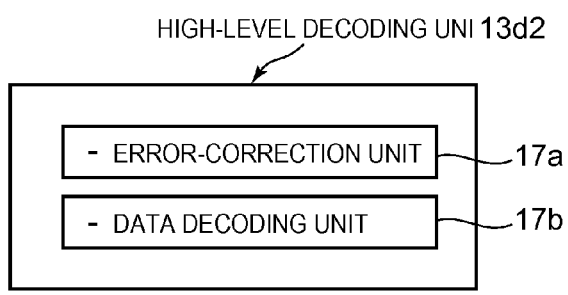
HIGH-LEVEL DECODING UNI 13d2
- ERROR-CORRECTION UNIT — 17a
- DATA DECODING UNIT — 17b
FIG. 21
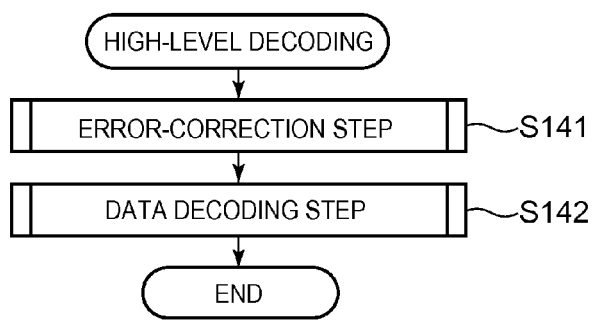
HIGH-LEVEL DECODING
ERROR-CORRECTION STEP — S141
DATA DECODING STEP — S142
END
FIG. 22
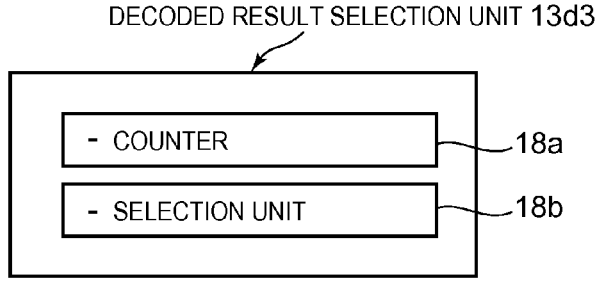
DECODED RESULT SELECTION UNIT 13d3
- COUNTER — 18a
- SELECTION UNIT — 18b

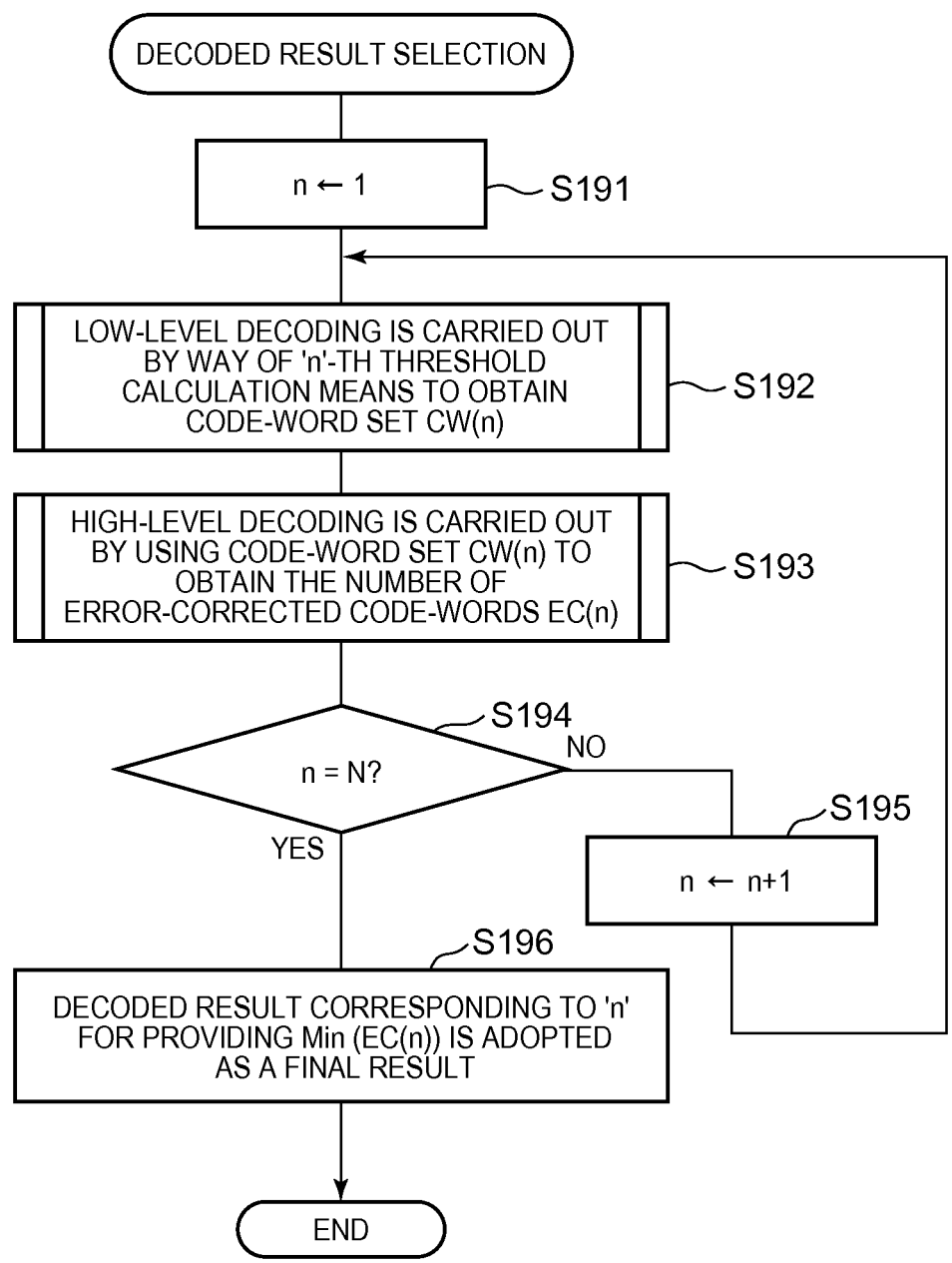

STACK BARCODE READER AND STACK BARCODE READING METHOD

CROSS REFERENCE TO RELATED APPLICATION

The present invention claims priority under 35 U.S.C. §119 to Japanese Application No. 2013-068945, filed Mar. 28, 2013, the entire contents of which are incorporated herein by reference.

FIELD OF THE INVENTION

The present invention relates to a stack barcode reader and a stack barcode reading method in order to optically read a stack barcode.

BACKGROUND

Conventionally, various types of barcodes are used for management of commodities, baggage and so on. Those various types of barcodes include a type of barcode called two-dimensional barcode. In the two-dimensional barcode, information is recorded in extents of two directions, i.e., vertical and horizontal directions, and the two-dimensional barcode has an increased greater memory capacity than a type of one-dimensional barcode in which information is written only in one direction.

In general, a barcode includes a bar having a low reflectance, such as colored in black; and a space having a high reflectance, as a blank part with nothing printed, such as colored in white; while the bar and the space being alternately placed in order to record intended information composed of alphanumeric characters. Sometimes the barcode is used in a form of a barcode label, in which the barcode is printed on a sticker and the like, so as to be attached to an object; or in another way, the barcode is used in a form of being directly printed on an object. While the barcode being scanned with a light beam such as a laser light, reflected light is detected by using a light receiving element of a photo acceptance unit in order to measure width of each bar and each space of the barcode. Then, by way of decoding obtained analog signal, information encoded in the barcode is read.

In a category of two-dimensional barcodes, there is a type in which one-dimensional barcodes are so stacked as to increase its amount of information, and such a type of barcode is called a stack barcode. As a typical example of the stack barcode, there is a coding scheme called PDF417. Incidentally, the coding scheme PDF417 is internationally standardized as ISO/IEC15438.

As an apparatus for reading such a stack barcode, there exists a symbol information reading device, for example, as disclosed in Patent Document 1. The symbol information reading device disclosed in Patent Document 1 images a stack barcode by using a two-dimensional imaging unit, and represents a quality condition of the stack barcode with a numerical value to make it possible to assess a deterioration condition of the stack barcode.

PATENT DOCUMENT

Patent Document 1: Japanese Unexamined Patent Application Publication No. 2012-083835

Unfortunately, if a resolution of an imaging optical system for imaging the stack barcode does not reach a certain level, a scanning reflectance rate waveform of the stack barcode gets fluctuated. Therefore, even the symbol information reading device disclosed in Patent Document 1 has an issue that a scanning reflectance rate waveform gets so fluctuated that a boundary between a bar and a space cannot accurately be detected. As a result, an accuracy of reading the stack barcode is in danger of getting deteriorated.

SUMMARY

Then, at least an embodiment of the present invention provides a stack barcode reader and a stack barcode reading method that can carry out a more highly-accurate decoding process.

In order to give a solution to the issue described above, at least an embodiment of the present invention provides the following aspects.

(1) A stack barcode reader comprising: an imaging section for imaging a stack barcode in which character information is coded into a barcode so as to be expressed with a bar and a space; an image memory for storing image data of the stack barcode imaged by the imaging section; a data processing section including a decoding unit for decoding the barcode of the stack barcode into the character information, on the basis of the image data; wherein the decoding unit includes a low-level decoding unit having a plurality of threshold calculation means for calculating a boundary between the bar and the space by different means; a high-level decoding unit for decoding the stack barcode into the character information by use of a code-word converted in the low-level decoding unit; and a decoded result selection unit for selecting a decoded result; and the high-level decoding unit includes an error-correction unit for executing an error-correction step; and the decoded result selection unit includes a counter unit for counting the number of error corrections made in a code-word and storing it as the number of corrections; and a selection unit for selecting a decoded result having the less number of corrections by way of making a comparison of the numbers of corrections stored in the counter unit.

According to at least an embodiment of the present invention, the decoding unit calculates a boundary between a bar and a space by way of different means, and executes low-level decoding and high-level decoding in order to decode a stack barcode into character information so that the decoded result selection unit can select a decoded result having a less number of error corrections. Even among decoded data, there exists variation in reliability of the data. For that reason, it is possible for the stack barcode reader of at least an embodiment of the present invention to evaluate the variation in a quantitative way so that a more highly-accurate decoding process can be carried out.

(2) A stack barcode reading method comprising: a threshold calculation step for calculating a threshold for measuring line width of a bar and a space of a stack barcode by using brightness values of a plurality of pixels constituting image data, at a time of decoding a barcode of the stack barcode into character information, on the basis of the image data obtained by way of imaging the stack barcode in which the character information is coded into the barcode so as to be expressed with the bar and the space; an n-th differential value calculation step for calculating an n-th differential value (a first differential value or a secondary differential value) by way of differentiating a scanning reflectance rate waveform representing the brightness values of the plurality of pixels constituting the image data; a line width measurement step for measuring the line width of the bar and the space of the stack barcode, on the basis of the threshold and the n-th differential value; a T-sequence measurement step for measuring T-sequence according to the line width of the bar and the space of the stack barcode measured at the line width measurement step; a code-word obtainment step for obtaining a code-word corresponding to the T-sequence measured at the T-sequence measurement step; and a high-level decoding step for decoding the stack barcode into the character information by use of the code-word; wherein the high-level decoding step has an error correction step for carrying out an error correction process: and the decoded result selection step includes a counter step for counting the number of error corrections made in a code-word and storing it as the number of corrections; and a selection step for selecting a decoded result having the less number of corrections by way of making a comparison of the numbers of corrections stored in the counter step.

According to at least an embodiment of the present invention, a boundary between a bar and a space is calculated by way of different means (a threshold calculation step and an n-th differential value calculation step), and then low-level decoding and high-level decoding is executed in order to decode a stack barcode into character information so that a decoded result having a less number of error corrections can be selected. Even among decoded data, there exists variation in reliability of the data. For that reason, it is possible in the stack barcode reading method of at least an embodiment of the present invention to evaluate the variation in a quantitative way so that a more highly-accurate decoding process can be carried out.

According to at least an embodiment of the present invention, the decoding unit calculates a boundary between a bar and a space by way of different means, and executes low-level decoding and high-level decoding in order to decode a stack barcode into character information so that the decoded result selection unit can select a decoded result having a less number of error corrections. Even among decoded data, there exists variation in reliability of the data. According to at least an embodiment of the present invention, it is possible to evaluate the variation in a quantitative way so that a more highly-accurate decoding process can be carried out.

Moreover, according to at least an embodiment of the present invention, a boundary between a bar and a space is calculated by way of different means (a threshold calculation step and an n-th differential value calculation step), and then low-level decoding and high-level decoding is executed in order to decode a stack barcode into character information so that a decoded result having a less number of error corrections can be selected. Even among decoded data, there exists variation in reliability of the data. According to at least an embodiment of the present invention, it is possible to evaluate the variation in a quantitative way so that a more highly-accurate decoding process can be carried out.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 9A and 9B are waveform diagrams showing a pixel value of each line in a horizontal direction of corrected image data.

FIG. 10 is an explanation drawing for explaining a process of identifying separation of a row in a stack barcode.

FIG. 16($b$) is a flowchart showing a workflow of a T-sequence measurement process.

FIG. 19 is a table that lists the number of error-correction code-words corresponding to a given safety protection level of an example of a stack barcode.

FIG. 20 is a block diagram showing a high-level decoding unit of a stack barcode reader according to the first embodiment.

FIG. 21 is a flowchart showing a workflow of high-level decoding in the flowchart shown in FIG. 5.

FIG. 22 is a block diagram showing a decoded result selection unit of a stack barcode reader according to the first embodiment.

FIG. 23 is a flowchart showing a workflow of a decoded result selection.

DESCRIPTION OF THE PREFERRED EMBODIMENTS

First Embodiment of the Invention

Embodiments of the present invention are described below with reference to the accompanying drawings.
(Stack Barcode Reader)

Figure 1:
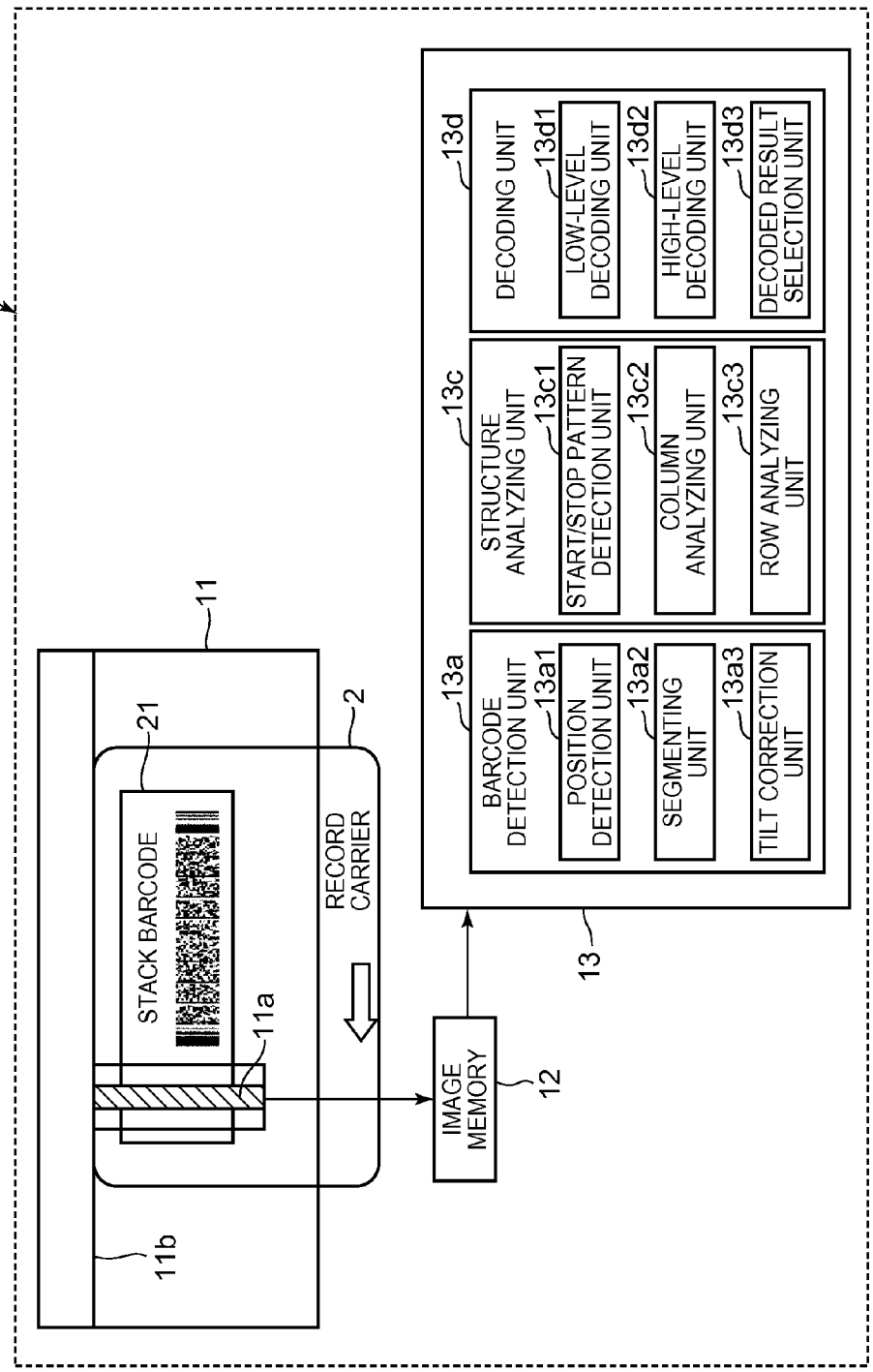
FIG. 1 is a block diagram showing an electrical configuration of a stack barcode reader according to a first embodiment of the present invention.

FIG. 1 is a block diagram showing an electrical configuration of a stack barcode reader 1 according to the first embodiment of the present invention.

In FIG. 1, the stack barcode reader 1 includes an imaging unit 11, an image memory 12, and a data processing unit 13. The data processing unit 13 includes a barcode detection unit 13a, a structure analyzing unit 13c, and a decoding unit 13d. On a record carrier 2 such as a card, printed is a stack barcode 21 that is a kind of two-dimensional barcode. The barcode detection unit 13a includes a position detection unit 13a1, a segmenting unit 13a2, and a tilt correction unit 13a3. The structure analyzing unit 13c includes a start/stop pattern detection unit 13c1, a column analyzing unit 13c2, and a row analyzing unit 13c3. The decoding unit 13d includes a low-level decoding unit 13d1, a high-level decoding unit 13d2, and a decoded result selection unit (a decoding judgment unit) 13d3. Incidentally, in PDF417 as a kind of barcode coding scheme for the stack barcode 21, two types of decoding steps, namely a low-level decoding step and a high-level decoding step, are carried out.

The imaging unit 11 includes a contact-type image scanner 11a and a card transfer mechanism 11b. The image scanner 11a receives reflected light of light radiated onto the stack barcode 21, printed on the record carrier 2, and converts the received light into an electrical signal by way of photoelectric conversion in order to obtain image data of the stack barcode 21. The image scanner 11a obtains multi-valued image data, for example, of 8-bit and 256-step. The obtained image data of the stack barcode 21 is stored in the image memory 12.

The data processing unit 13 imports the image data of the stack barcode 21 from the image memory 12, and various kinds of processes are conducted on the imported image data.

Figure 2:
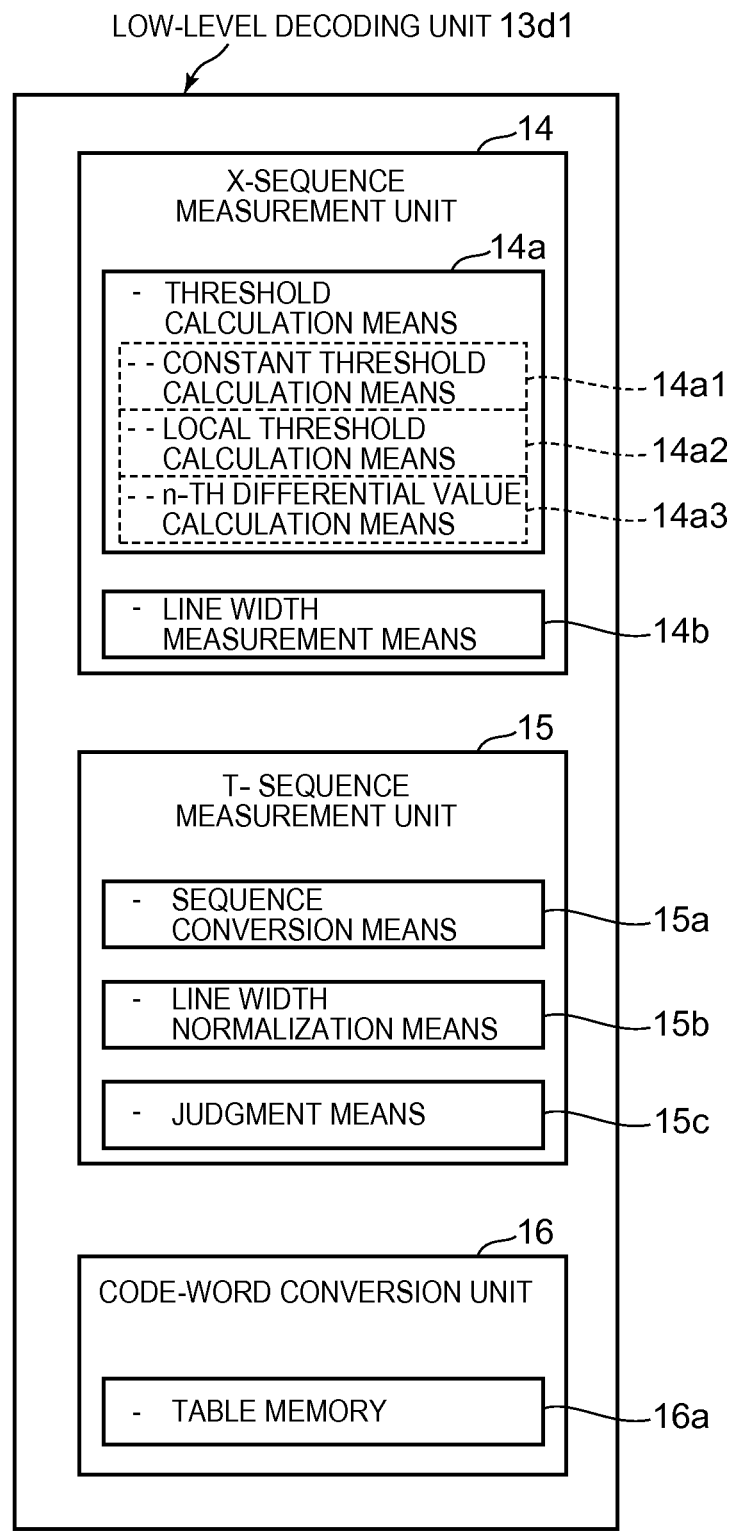
FIG. 2 is a block diagram showing a low-level decoding unit of a stack barcode reader according to the first embodiment.

The low-level decoding unit 13d1 includes an X-sequence measurement unit 14, a T-sequence measurement unit 15, and a code-word conversion unit 16, as shown in FIG. 2.

The X-sequence measurement unit 14 includes a threshold calculation means 14a and a line width measurement means 14b. The threshold calculation means 14a comprises a constant threshold calculation means 14a1, a local threshold calculation means 14a2, and an n-th differential value calculation means 14a3.

The T-sequence measurement unit 15 has a sequence conversion means 15a, a line width normalization means 15b, and a judgment means 15c. The sequence conversion means 15a has a function of converting a line width matrix calculated by way of an X-sequence into a line width matrix for a T-sequence. In the meantime, the judgment means 15c has a function of comparing a cluster number to be described later with a theoretical value.

The code-word conversion unit 16 has a table memory 16a, in which a code-word conversion table showing relationships between T-sequence and a code-word is stored.
(Structure of a PDF417 Stack Barcode)

Figure 3:
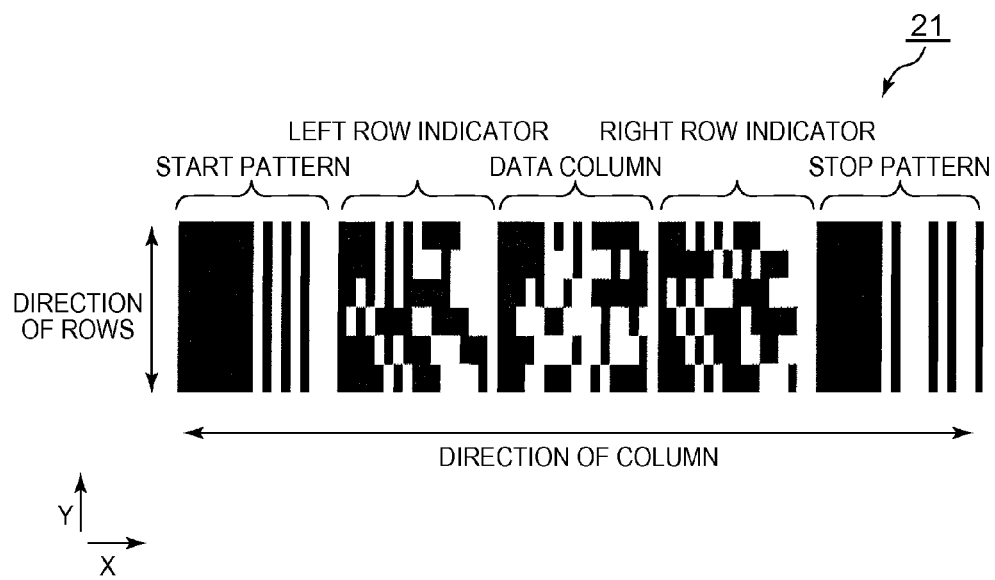
FIG. 3 is a diagram showing an example of a stack barcode.
Figure 18:
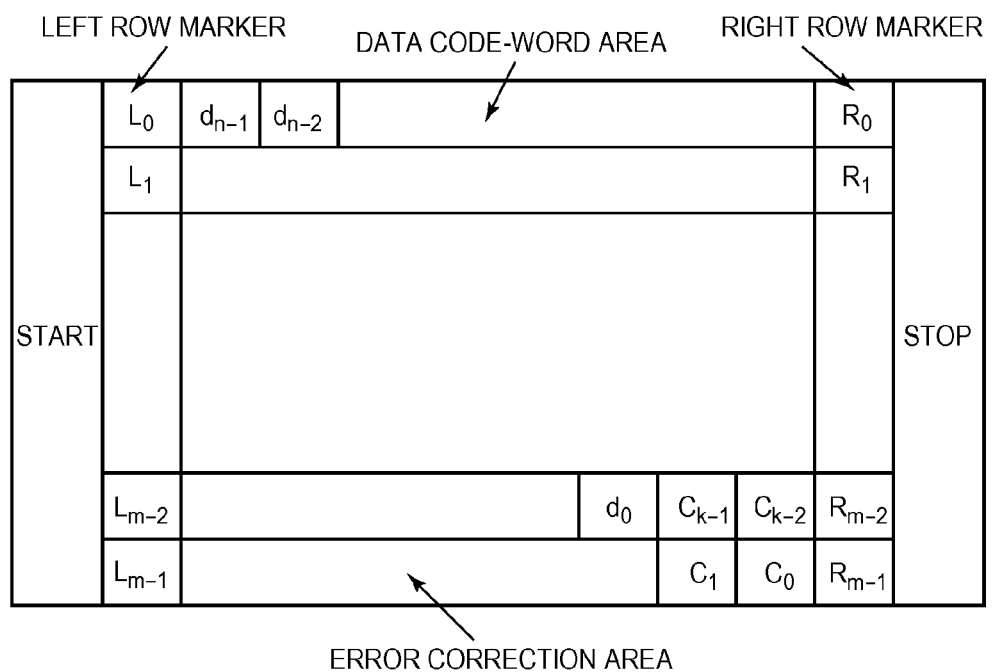
FIG. 18 is a block wiring diagram showing a general structure of an example of a stack barcode.

FIG. 3 is a diagram showing an example of the stack barcode 21 (i.e., a stack barcode according to a label structure of PDF417). FIG. 18 is a block wiring diagram showing a general structure of an example of the stack barcode 21 (i.e., a stack barcode according to a label structure of PDF417). FIG. 19 is a table that lists the number of error-correction code-words corresponding to a given safety protection level of an example of the stack barcode 21 (i.e., a stack barcode according to a label structure of PDF417). Incidentally, in this specification document, the stack barcode 21 is explained with reference to PDF417.

In the stack barcode 21, a horizontal direction (X-direction) represents a direction of columns, and meanwhile a vertical direction (Y-direction) represents a direction of rows. The direction of rows is a direction in which a plurality of rows are laid out. The direction of columns is a direction in which a plurality of columns are laid out; and in the present embodiment, the direction of columns is divided into five major sections. In other words; as FIG. 3 shows, a data column is placed at a middle part, and a left row indicator and a right row indicator are placed at a left side and a right side next to the data column, respectively. Moreover, a start pattern and a stop pattern are placed at a left side and a right side next to the above three sections, respectively. In the meantime, a barcode part constituting each column is composed of black bar parts and white space parts, and a wide bar called 'big bar' is formed each in the start pattern and the stop pattern. In FIG. 3, the big bar is a bar, i.e., a widest black part, at a left side position in the start pattern as well as the stop pattern.

Moreover, as shown in FIG. 3, each of the data column, the left row indicator and the right row indicator is composed of six rows (from Row 1 to Row 6) in the direction of rows. Three columns (the data column, the left row indicator and the right row indicator) included in each row contains each one code-word. For example, in the data column of the stack barcode 21, six code-words, namely one code-word (for one data column)×six rows, are included. Incidentally, a code-word is an elemental unit for symbolizing a value expressing a certain numerical value, a certain character, or any other symbol, or otherwise a value in relation to any of them.

Incidentally, a barcode includes black bars and white bars, having different width, placed alternately; and a minimum width of the bar is called 'module.' Moreover, both right and left ends of the barcode are each provided with a start code and a stop code, respectively; and a data code including a plurality of code-words is provided between the start code and the stop code. The number of bars, the number of modules and the like, included in the start code and the stop code, are specific to a kind of barcode; and the number of bars included in one code-word, the number of modules included in one code-word, and the like are also specific to the kind of barcode.

Incidentally, except a case of the stop pattern, there exist four bars and four spaces in each column. Then, each line width is an integral multiple of the minimum width called 'module (unit).' Meanwhile, a line width of one code-word is 17 modules; and each of the bars and spaces is six modules at the maximum in its width. Incidentally, in the case of the stop pattern, there exist five bars and four spaces, and then a line width of one code-word is 18 modules.

Although the stack barcode 21 shown in FIG. 3 includes only one data column, it is not limited to this structure and it may include a plurality of data columns. Moreover, in the stack barcode 21, the number of rows and the number of columns (data columns) can be modified. The stack barcode 21 needs to have at least three rows, and it can include up to 90 rows at the maximum. In a similar way, the number of code-words or the number of columns (data columns) in each row can be modified in a range from three to 30.

In the stack barcode 21, each row of a symbol includes: a start pattern, a left row indicator (code-word) Li, either a data column (code-word) di or an error detection/correction code-word Ci, and a stop pattern. The minimum number of code-words in a row is three; including the left row indicator (code-word) Li, at least one data code-word, and a right row indicator (code-word) Ri. The right row indicator (code-word) Ri and the left row indicator (code-word) Li help a structure of the stack barcode 21 to synchronize (to be described later for more detail). Incidentally, in FIG. 18, a left row marker and a right row marker represent the left row indicator (code-word) Li and the right row indicator (code-word) Ri, respectively.

The stat pattern and the stop pattern define where each row of the stack barcode 21 starts and stops. For example, in PDF417 as the stack barcode 21, a specific start pattern and a specific stop pattern are used. The start pattern, namely a left side of each row, has a specific pattern of "8 1 1 1 1 1 1 3", i.e., X-sequence. In the meantime, the stop pattern, namely a right side of each row, has a specific X-sequence of "7 1 1 3 1 1 1 2 1".

Every symbol includes a code-word that indicates the total number of code-words within the symbol (a first data code-word within Row 0) and at least two error detection code-words C0 and C1. The two error detection code-words collectively make up an inspection sum having a two-code-word length. In the stack barcode 21 (PDF417), data can also be symbolized with an error correction capability being provided. With respect to a level of an error correction capability called "safety protection level", a user makes a choice in a range from 0 to 8. This means that, in the case of Level 6, for example, a whole extent of the symbol can be read and decrypted, even when 126 code-words in total are lost or driven out.

FIG. 19 is a table showing relationships between the safety protection level of the stack barcode 21 (PDF417) and the number of error detection/correction code-word Ci.

In addition to correction of data that is lost or driven out (known as "deleted"), in the stack barcode 21 (PDF417), it is also possible to restore out of erroneous decryption of code-words. Since two code-words are needed for restoration out of erroneous decryption of code-words (one code-word for error detection and the other for correcting it), a certain safety protection level is able to support one half of the number of erroneous decryption of un-decrypted code-words that the safety protection level can deal with.

Explained below is a stack barcode reading method according to the first embodiment of the present invention.

(Stack Barcode Reading Method)

Figure 5:
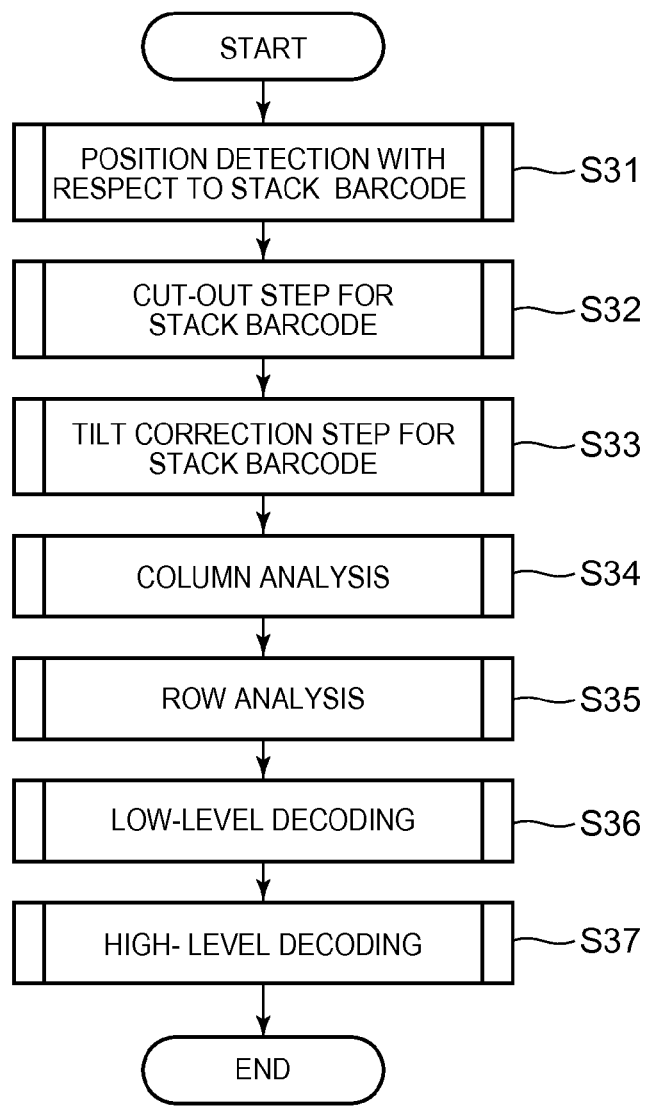
FIG. 5 is a flowchart showing a workflow of a stack barcode reading method according to the first embodiment of the present invention.

FIG. 5 is a flowchart showing a workflow of a stack barcode reading method according to the first embodiment. The workflow of the stack barcode reading method according to the first embodiment is generally explained on the basis of FIG. 5.

The data processing unit 13 extracts the stack barcode 21. A position of the barcode 21 is detected out of image data stored in the image memory 12 to cut out the image data. Moreover, if needed, a tilt correction is carried out. Incidentally, for a structure of at least an embodiment of the present invention, a tilt correction step is not indispensable.

A position detection step (Step S31 in FIG. 5), a cut-out step (Step S32), and a tilt correction step (Step S33) are conducted in the present embodiment.

At first, a position detection with respect to the stack barcode 21 is carried out (Step S31). Concretely to describe, as shown in FIG. 1, the image scanner 11a of the stack barcode reader 1 converts the reflected light of the light, radiated onto the stack barcode 21, into an electrical signal by way of photoelectric conversion in order to obtain image data; the stack barcode 21 being placed on the record carrier 2 that has moved along the card transfer mechanism 11b to a predetermined position. Then, the obtained image data of the stack barcode 21 is stored in the image memory 12. The image memory 12 is structured with a finite number of pixels that are arranged in a two-dimensional manner.

In this first embodiment, the image data of the stack barcode 21, which has been imaged, represents a brightness value of each pixel (as a pixel value) with a numerical value. The brightness value is expressed as an 8-bit 256-step image datum, for example, as an integer in a range from 0 to 255. Incidentally, the memory 12 may be materialized with any device, such as a RAM, an SDRAM, a DDRSDRAM, an RDRAM, and the like, as far as the device can store image data.

After that, the position detection unit 13a1 of the data processing unit 13 reads in the image data stored in the image memory 12, and then detects a position of the stack barcode 21 in the image data.

The stack barcode 21, for which the position detection has been carried out in this way, is cut out at the segmenting unit 13a2 of the data processing unit 13 (Step S32); and then the image data cut out is stored in the image memory 12.

Next, in the data processing unit 13, a tilt correction with respect to the stack barcode 21 is carried out (Step S33). More specifically, the tilt correction unit 13a3 of the data processing unit 13 reads in the image data cut out at Step S32; i.e., the image data of the stack barcode 21 imaged in such a way as to be in a tilted condition as shown in FIG. 4; and then converts the image data into corrected image data having a tilt angle of zero as shown in FIG. 3.

Figure 4:
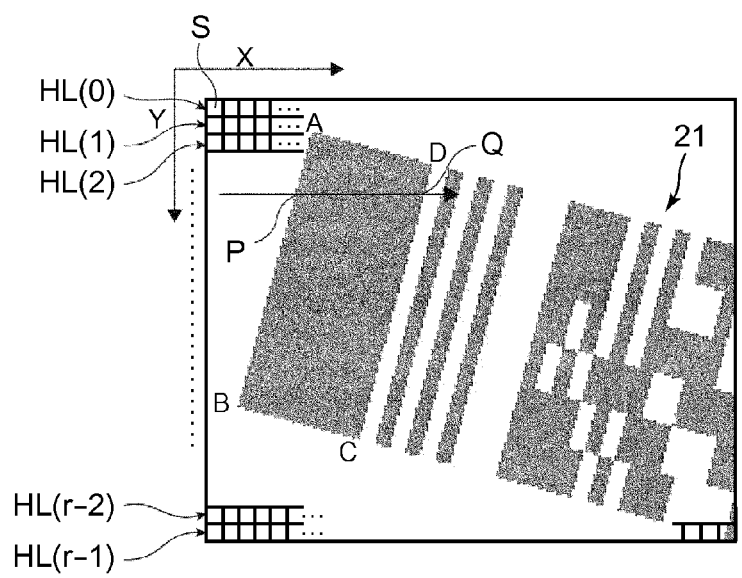
FIG. 4 is a magnified view of a big-bar section of a start pattern and its surrounding area in a stack barcode.

FIG. 4 is a magnified view of a big-bar section of a start pattern and its surrounding area in the stack barcode 21. Moreover, FIG. 4 shows an appearance of the stack barcode 21 imaged in a tilted condition by use of the image scanner 11a of the imaging unit 11. At a time when the stack barcode 21 is imaged by use of the imaging unit 11, the direction of rows in the stack barcode 21 is not necessarily placed so as to be vertical to the card transfer mechanism 11b. The image data read out by use of the image scanner 11a may be tilted sometimes, for example, as shown in FIG. 4. In other words, the direction of rows is not consistent with a vertical direction in the image data stored in the image memory 12. In such a case, due to a noise attributed to a quantization error generated by way of converting the image data among pixels, in accordance with the coordinate conversion, decoding reliability is conventionally deteriorated. On the other hand, in this first embodiment, an interpolation process and an averaging process are carried out for the purpose of smoothing, with respect to an image after the coordinate conversion, in order to reduce an impact of the noise.

Next, a structural analysis (column analysis and row analysis) are carried out in the data processing unit 13 (Step S34 and Step S35). More specifically, the structure analyzing unit 13c of the data processing unit 13 analyzes a structure of the stack barcode 21, on the basis of the corrected image data converted at Step S33. In the structure analyzing unit 13c, a column analysis (Step S34) and a row analysis (Step S35) are carried out in the column analyzing unit 13c2 and the row analyzing unit 13c3.

At the end, a decoding step (including Step S36 and S37) is carried out in the decoding unit 13d of the data processing unit 13. More specifically, the decoding unit 13d of the data processing unit 13 carries out a decoding step with respect to the stack barcode 21, on the basis of the structure of the stack barcode 21 analyzed at Step S34 and Step S35. At this time, in the case of PDF417 which is a kind of stack barcode 21, two decoding steps including a low-level decoding step and a high-level decoding step are carried out. The low-level decoding unit 13d1 of the decoding unit 13d conducts the low-level decoding step (Step S36), and meanwhile the high-level decoding unit 13d2 conducts the high-level decoding step (Step S37). In the low-level decoding step, code-words constituting a data column that include a line width of each bar and a line width of each space, are once converted into intermediate information expressed with 929 codes that are numbered with numerals of 0 to 928. Then, in the high-level decoding step, after the code-words are once converted into the intermediate information expressed with 929 codes, the intermediate information is decoded into a final language, on the basis of a predetermined rule. As the final language, for PDF417, there are ASCII characters, binary expressions, other characters, and the like.

Each step (Step S31 to Step S37) of the flowchart shown in FIG. 5 is explained below in detail.

(Position Detection of Stack Barcode)

Figure 6:
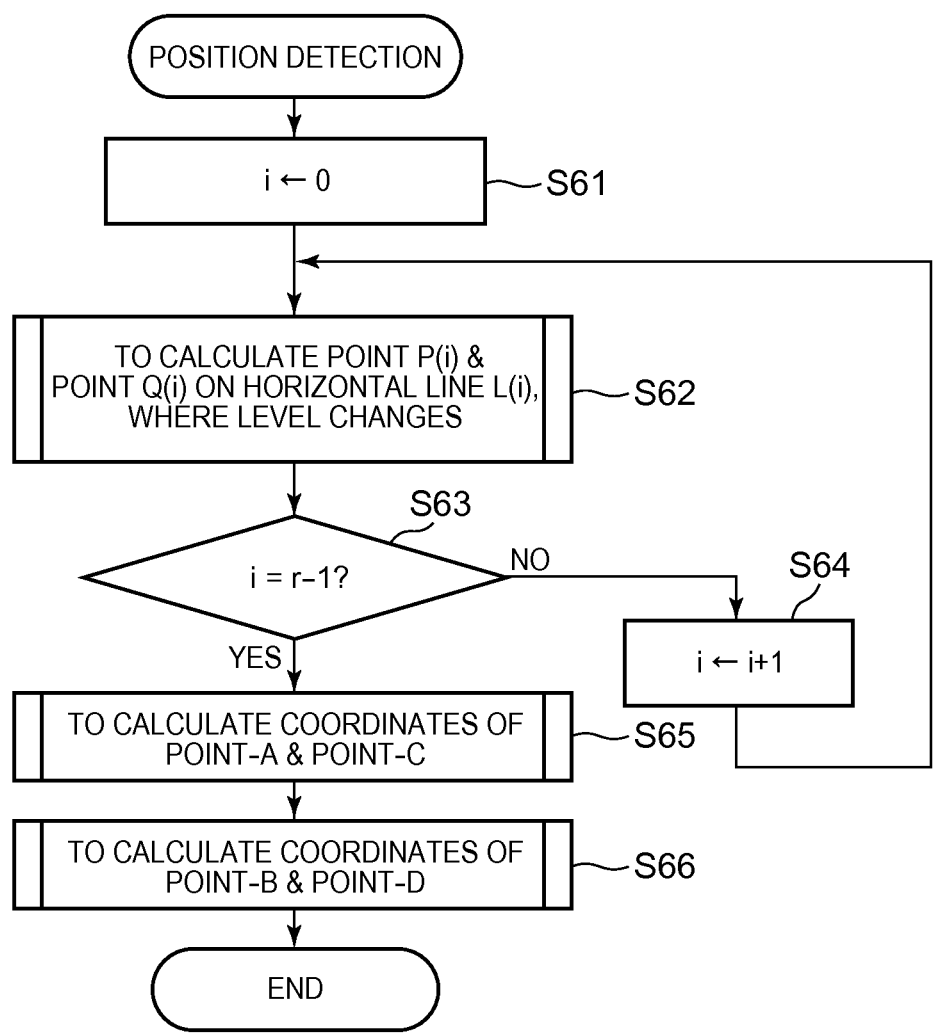
FIG. 6 is a flowchart showing a workflow of position detection of stack barcode in the flowchart shown in FIG. 5.

FIG. 6 is a flowchart showing a workflow of position detection of stack barcode (Step S31) in the flowchart shown in FIG. 5. FIG. 4 is a magnified view of a big-bar section of a start pattern and its surrounding area in the stack barcode 21.

In FIG. 6, 0 is assigned to a variable 'i' (the 'i' is an integer) to return to a predetermined original point (Step S61). Concretely to describe, FIG. 4 shows an area surrounding a part of the stack barcode 21 of the image data stored in the image memory 12, and a pixel 'S' at the upper left is the predetermined original point. Then, at Step S61, a row of one pixel in a horizontal direction (X-direction) is set as a horizontal line HL(0), and an image datum of an initial pixel 'S' is read in.

Then, with respect to a row of an 'i'-th pixel in a vertical direction (Y-direction) from the horizontal line HL(0), an image datum of each pixel in the X-direction is read in, on a horizontal line HL(i) at Y='i' in order to search for a point at which an image changes for the first time from 'light' to 'dark' (defined as a point P(i)). Concretely to describe, image data of pixels, namely brightness values of the pixels are separated into two groups; one group of 'bright' pixels (white part) having a brightness value higher than a predetermined threshold (the part is hereinafter called "space") and the other group of 'dark' pixels (black part) having a brightness value lower than the predetermined threshold (the part is hereinafter called "bar"); in order to detect a pixel position at which a "space" pixel is replaced for the first time with a "bar" pixel. The pixel position of the change becomes a boundary between the space and the bar.

Moreover, on the same horizontal line HL(i), searched for next is a point at which an image changes for the first time from 'dark' to 'light' (defined as a point Q(i)). Concretely, detected is a pixel position at which a "bar" pixel (a pixel representing 'dark') is replaced for the first time with a "space" pixel (a pixel representing 'bright') (Step S62).

Subsequently, it is judged whether or not a condition of "i=r−1" is satisfied (wherein, r: the number of rows (the number of pixels) in the Y-direction in FIG. 4) (Step S63). If it is judged the condition is not satisfied, 'i' is incremented by one (Step S64) and the step of S62 is carried out again. On the other hand, if a search has started with the pixel 'S' shown in FIG. 4, and already searched a brightness value of each pixel in the X-direction, and the search has completed down to a final pixel of a final row, it is judged that the condition of "i=r−1" is satisfied. If it is judged in this way that the condition is satisfied, operation progresses to a next step S65. Incidentally, at this stage, 'r' sets of points (P(i), Q(i)) (wherein, i=0, 1, - - - , r−2, and r−1) have been obtained.

Next, coordinate values of a point 'A' and a point 'C' shown in FIG. 4 are calculated (Step S65). More specifically, pixel positions corresponding to the point 'A' and the point 'C' are detected. In the X-direction, d(i)=|P(i)−Q(i)| is calculated, and a minimum value "min(d(i))" is obtained out of the d(i)s calculated. The "min(d(i))"s having a shortest distance between the point P(i) and the point Q(i) are corresponding to two points, namely the point 'A' and the point 'C' of the big bar (refer to FIG. 4). Accordingly, Y-coordinates of the point 'A' and the point 'C' (positions of corresponding pixels in the Y-direction) are given as "Ay=max (i)" and "Cy=min(i)", respectively. Meanwhile, X-coordinates of the point 'A' and the point 'C' (positions of corresponding pixels in the X-direction) are given as an X-coordinate of a point P(i) corresponding to each 'i', namely Ax=an X-coordinate of P(i=Ay) and Cx=an X-coordinate of P(i=Cy), respectively.

Next, coordinates of a point 'B' and a point 'D' shown in FIG. 4 are calculated (Step S66). More specifically, an area of 'i' where the d(i) remains constant is identified. Then, Y-coordinates of the point 'B' and the point 'D' of the big bar are given as a min(i) and a max(i) in the area, respectively. Meanwhile, X-coordinates of the point 'B' and the point 'D' are given as X-coordinates of a point P(i) and a point Q(i) corresponding to each 'i', respectively; namely Bx=an X-coordinate of P(i=By) and Dx=an X-coordinate of Q(i=Dy), respectively.

By means of processes from Step S61 to Step S66 in this way, coordinates of four corners of the big bar; namely the point 'A', the point 'B', the point 'C', and the point 'D' (positions of corresponding pixels) are identified. Then, a tilt angle can be calculated as "a tan ((Ay−Dy)/(Ax−Dx))."

Incidentally, for the purpose of an improvement of a detection accuracy of the tilt angle, in FIG. 4, functions of the X-direction and the Y-direction may be replaced each other to carry out the process steps in a similar manner. Then, coordinate values of four corners of the big bar, i.e., the point A', the point B', the point C', and the point D', are calculated; and then an average of each of these coordinate values and each of the coordinate values of the point 'A', the point 'B', the point 'C', and the point 'D' described above may be calculated, respectively, to obtain ultimate coordinate values.

Moreover, although it is described with reference to FIG. 6 to calculate the coordinates of the point B and the point D (at Step S66), together with the point A and the point C (at Step S65), the present invention is not limited to this arrangement. For example, the tilt may be detected by way of calculating only the coordinates of the point A and the point C.

(Cut-Out of Stack Barcode)

After identifying the coordinates of the four corners of the big bar by means of the process steps of Step S61 through Step S66, the stack barcode 21 is cut out (Step S32). Incidentally, a rectangle slightly larger than a whole size of the stack barcode 21 is cut out.

(Tilt Correction of Stack Barcode)

Next, the tilt correction with respect to the stack barcode 21 is carried out (Step S33).

FIG. 3 is a diagram showing an appearance of conversion in which the image data of the stack barcode 21 tilted with the angle described above (=a tan ((Ay−Dy)/(Ax−Dx))) is converted into the corrected image data having a tilt angle of zero. In other words, the image data of the stack barcode 21 shown in FIG. 3 is corrected in such a way that the direction of columns and the direction of rows of the image data are consistent with the horizontal direction (X-direction) and the vertical direction (Y-direction) in an area of the image memory 12 shown in FIG. 4, respectively.

With reference to FIG. 3, the conversion into the corrected image data having a tilt angle of zero is carried out by using the tilt angle of the stack barcode 21. For example, the conversion can be carried out by using a widely-known method such as an affine transformation, and therefore an explanation in detail here is omitted.

Figure 12:
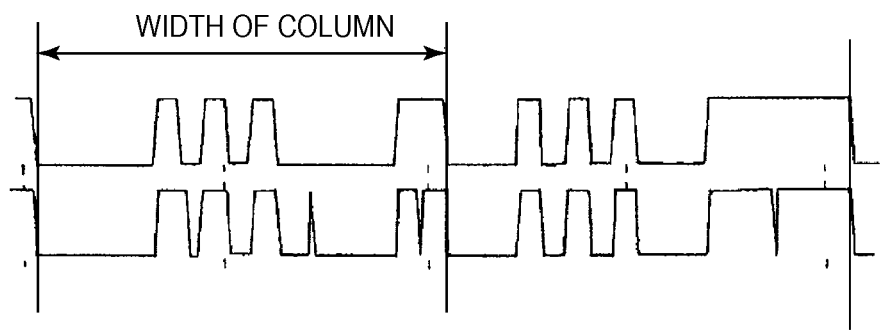
FIG. 12 is a waveform diagram showing part of a scanning reflectance rate waveform that represents a brightness value of each pixel included in a row of a stack barcode.

In the stack barcode reading method according to the present first embodiment, an interpolation process and an averaging process are carried out for the purpose of smoothing, with respect to an image after the coordinate conversion, in order to reduce an impact of a quantization error in accordance with the coordinate conversion. Concretely, as shown in FIG. 9(b) and FIG. 12, a brightness value of each pixel is given as a brightness value representing a space (for example, 100), or a brightness value representing a bar (for example, 0).

In the meantime, the corrected image data is smoothed by using various kinds of filters, such as a median filter, an edge preserving filter, an adaptive Wiener filter, a moving average filter, and the like.

(Structural Analysis)

Figure 7:
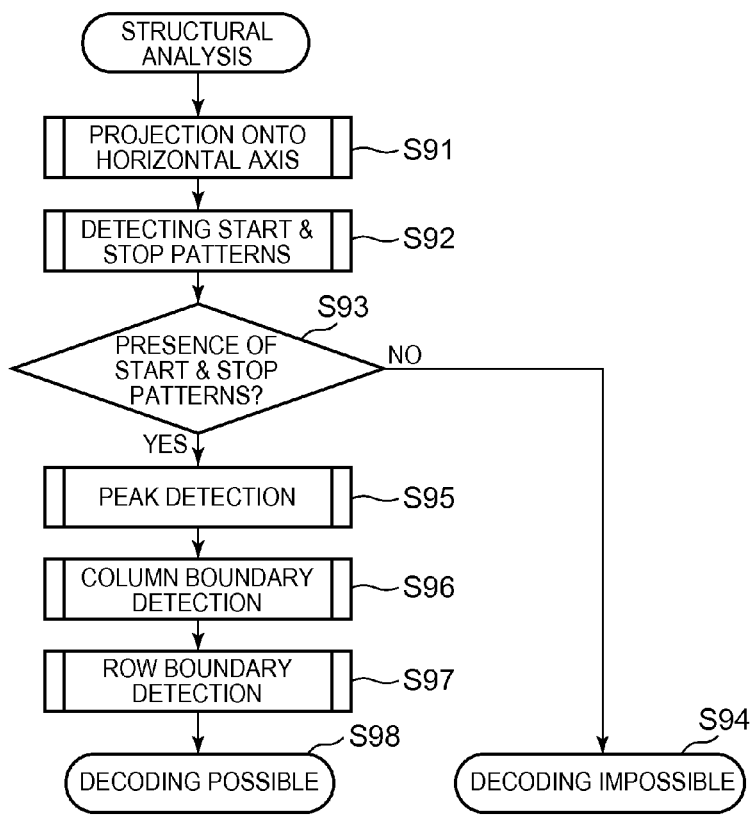
FIG. 7 is a flowchart showing a workflow of a structural analysis (column analysis and row analysis) in the flowchart shown in FIG. 5.

FIG. 7 is a flowchart showing a workflow of a structural analysis (Step S34 and Step S35) in the flowchart shown in FIG. 5.

In FIG. 7, a projection onto the horizontal axis is conducted (Step S91) at first. Concretely, it is a process in which a sum of brightness values of all pixels arranged in a vertical direction is calculated, with respect to each of pixel columns arranged in a horizontal direction, according to the corrected image data of the stack barcode 21 shown in FIG. 3, and then the sum is stored in the image memory 12.

Subsequently, with respect to the obtained sum of brightness values, a difference between pixels positioned side-by-side in a horizontal direction is calculated, and then an analysis on the start pattern and the stop pattern is made by using the calculated difference value (Step S92).

As shown in FIG. 3 and so on; with respect to the start pattern and the stop pattern, being different from code-words of other sections such as the data column, the left row indicator, and the right row indicator, there exists a common and constant pattern in every row (six rows in this first embodiment). Therefore, each of the start pattern and the stop pattern is averaged by conducting a projection onto the horizontal axis so that, being unlikely affected by uneven brightness, a stain, and the like, a stable detection can be carried out.

Figure 8A:
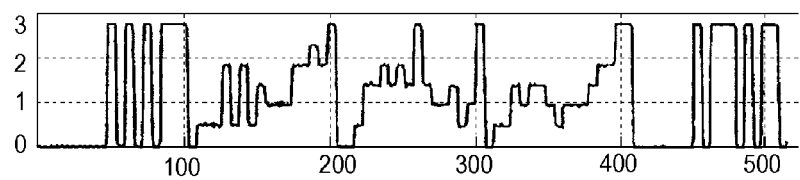
FIGS. 8A and 8B are graphs calculated as a result of conducting a predetermined process on corrected image data (refer to FIG. 3).
Figure 8B:
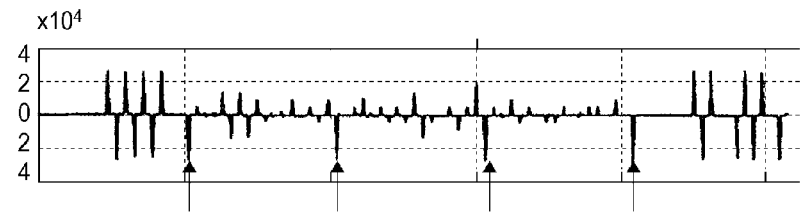

FIGS. 8A and B are diagrams obtained by way of conducting a predetermined process on the corrected image data (refer to FIG. 3). More specifically, FIG. 8(a) shows a calculation result of a projection of each of pixel columns in a vertical direction, with respect to the corrected image data (refer to FIG. 3); and to describe with reference to FIG. 3, the diagram shows a distribution of the sum of brightness values of all pixels in the direction of rows of the stack barcode 21. Meanwhile, FIG. 8(b) shows a calculation result of difference, with respect to the graph of FIG. 8(a). Concretely, between pixels positioned side-by-side in the horizontal direction of the image data stored in the image memory 12, a difference with respect to the obtained sum of brightness values is calculated, and then a distribution of the difference value is illustrated. In this way, a pixel position where a bar (or a space) is replaced with a space (or a bar) can be detected on a horizontal line L(i).

For a detection of the start pattern, an interval (run length) (hereinafter, called a 'line width') between points, where a bar and a space are replaced with each other, is measured by using a graph shown in either FIG. 8(a) and FIG. 8(b). In the present embodiment, the measurement is carried out by counting the number of pixels in the horizontal direction. For example, when a line width of each bar and a line width of each space are measured in the start pattern, obtained is a line width array such as StartWork=[47, 6, 5, 6, 7, 6, 6, 18]. In the meantime, ratios of the length of bars and spaces in the start pattern have a line width array represented as StartMark=[8, 1, 1, 1, 1, 1, 1, 3] according to the PDF417 standards. Then, as an index for analyzing a similarity of both the line width arrays, for example, a normalized correlation 'R' can be used. Applying a normalized correlation 'R' to FIG. 8(b) results in R=corrcoef (StartWork, StartMark)=0.9993, and 'R' is enough close to 1. Therefore, in this case, it is judged that the start pattern has properly been detected. Incidentally, since explanation in relation to a normalized correlation 'R' for the stop pattern is the same as that for the start pattern, the explanation is omitted on this occasion.

Incidentally, although the normalized correlation 'R' is used as an index for the similarity in this first embodiment, the present invention is not limited to this arrangement; and for example, a sum of absolute difference, a sum of product, and the like may arbitrarily be used.

After making a judgment in this way on whether or not the start pattern/the stop pattern have appropriately been detected (Step S93), operation moves to Step S95 if it is judged that the start pattern/the stop pattern have appropriately been detected. On the other hand, if it is judged that the start pattern/the stop pattern have not appropriately been detected, it is determined that decoding cannot be done, and namely decoding operation cannot be carried out, and then the operation finishes (Step S94).

Subsequently, with respect to the graph of FIG. 8(b), a peak detection is carried out (Step S95). More specifically, at a boundary of each column of the start pattern, the left row indicator, the data column, the right row indicator, and the stop pattern, a change from a space to a bar happens at every row, as show in FIG. 3, so that a great difference value appears at these boundary parts in the distribution of difference values in the projection onto the horizontal axis (upward arrows in FIG. 8(b)). Then, for identifying those difference values (peak values) indicated with the upward arrows in FIG. 8(b), an appropriate threshold is prepared in order to enable a judgment on a presence of a peak, by way of checking whether the difference value exceeds the threshold. If it is judged that the difference value corresponds to a peak, a pixel position having the peak value is stored in the image memory 12.

Next, a column boundary detection is carried out (Step S96). More specifically, according to pixel positions having the peak value, stored in Step S95, each boundary of five columns; i.e., the start pattern, the left row indicator, the data column, the right low indicator, and the stop pattern; is detected. Moreover, an interval between pixels having peak values, which are positioned side-by-side, represents a column width, and then the interval is also stored in the image memory 12. On this occasion, although sometimes a change point representing a boundary of each column cannot appropriately be detected in scanning a certain row in the case where a stain exists around a boundary in the row, an impact by the stain is reduced by way of averaging, if the projection onto the horizontal axis is used as the present first embodiment shows, so that such an unfavorable impact on detecting the boundary of each column can be controlled.

Next, a row boundary detection is carried out (Step S97). An explanation is given more specifically with reference to FIGS. 9A and 9B and FIG. 10. FIGS. 9A and 9B are waveform diagrams showing a brightness value of each line 'L' in a horizontal direction of corrected image data that have been averaged. FIG. 10 is an explanation drawing for explaining a process of identifying separation of each row in the stack barcode 21. Incidentally, in this first embodiment, one line 'L' is a matrix composed of one row×'n' columns, wherein 'n' is a width of a range to be evaluated.

In FIG. 9(a), for detecting a row boundary, a group composed of a plurality of lines 'L's, being consecutive, is set at first on the corrected image data. For example, a group (a line group S1) composed of three consecutive lines; L(1), L(2), and L(3); is set (the lines are hereinafter abbreviated as L1, L2, and L3) (refer to FIG. 10). Incidentally, although three consecutive lines 'L's are set in this first embodiment, the present invention is not limited to the "three" lines.

Then, while two lines being selected out of the three lines 'L's, a normalized correlation is calculated between the two line, so as to obtain three correlation values (L1 & L2, L1 &

L3, and L2 & L3) in total. If a least value of these three correlation values is greater than a predetermined threshold r0, it is judged that waveforms of L1, L2 and L3 (showing a brightness value of each pixel on the line 'L') are correlated one another, so that '1' is given to the line group S1 (refer to FIG. 10). On the other hand, if the least value is smaller than the predetermined threshold r0, it is judged that waveforms of two lines 'L's at least, from which the least value is obtained, are not correlated each other, so that '0' is given to the line group S1.

For example, with regard to the group composed of L1, L2, and L3 formed in a horizontal direction, as shown in FIG. 9(b), the lines of L1, L2, and L3 are all included in the same row, i.e., Row 1 (a highest row), and therefore a least value of the three correlation values is greater than the threshold r0 so that '1' is given (in FIG. 10, a judgment value for the line group S1 is '1').

Next, with respect to the corrected image data, the above-described group position is shifted in the direction of rows (in the vertical direction), (for example, being shifted to another line group S2 composed of L2, L3, and L4), and a series of correlation values are calculated. Then, it is judged whether a minim value of the series of correlation values is greater than the threshold r0 or not; and depending on the judgment, a judgment result of '0' or '1' is given to the line group.

As a result of repeating the above-described process (a process to give a judgment value) down to a group composed of lines of Ln−2, Ln−1, and Ln (a line group Sn−2), a series of data including (n−2) numerical values of '0' or '1' is obtained (right side columns in FIG. 10).

On this occasion, if three lines 'L's are selected from the same row, a line group composed of the three lines 'L's has a value close to '1'. On the other hand, if three lines Ls are selected across neighboring rows, the line group composed of those three lines 'L's has a value that is relatively small. More specifically, in FIG. 9(b), the lines positioned higher than the line L18 are included in Row 1, meanwhile the lines positioned lower than the line L18 are included in Row 2, and the line L18 is a line 'L' placed at a boundary between Row 1 and Row 2.

Therefore, line groups S16 to S18, each of which includes the line L18, mostly have a judgment value of '0', and line groups other than these line groups have a judgment value of '1' (refer to FIG. 10). A line group having a judgment value close to '0' means a row change position, and therefore such a row change position can be recognized by way of scanning the series of judgment values to identify a position where the judgment values are close to '0'. Incidentally, in this first embodiment, mutual similarity of the lines of Ls is evaluated by use of a correlation function; and therefore, as shown in FIG. 9(a), a useless calculation (cost of calculation) can be eliminated by making an evaluation range with a section excluding the start pattern and the stop pattern. In other words, every row in the start pattern and the stop pattern has a common pattern in such a way as to have the same line width pattern of bars and spaces.

As described above, the row boundary detection of Step S97 is carried out by a workflow of; Setting a line group->Calculating a series of correlation values->Comparing a minimum value of the series of correlation values and a threshold->Providing a judgment value of '0' or '1'->Scanning a series of judgment values. In this first embodiment, the detection is carried out with respect to Row 1 down to a final line 'L' of Row 6.

According to the row boundary detection, it is judged which row each line 'L' of the corrected image data is included in, for enabling a decoding process (decoding), and then operation finishes (Step S98).

Furthermore, in this first embodiment, by way of calculating an average of brightness values of each point on a plurality of lines 'L's included in a row, with respect to each row, a local noise of a line 'L' can be reduced. Moreover, the averaged pixel brightness value can be used, as being representative of characteristics of the row, for a decoding process to be described later. In this way, an accuracy of the decoding process (decoding) can be improved.

(Decoding)

Next, a decoding process for the stack barcode 21 is explained.

(Low-Level Decoding)

Figure 11:
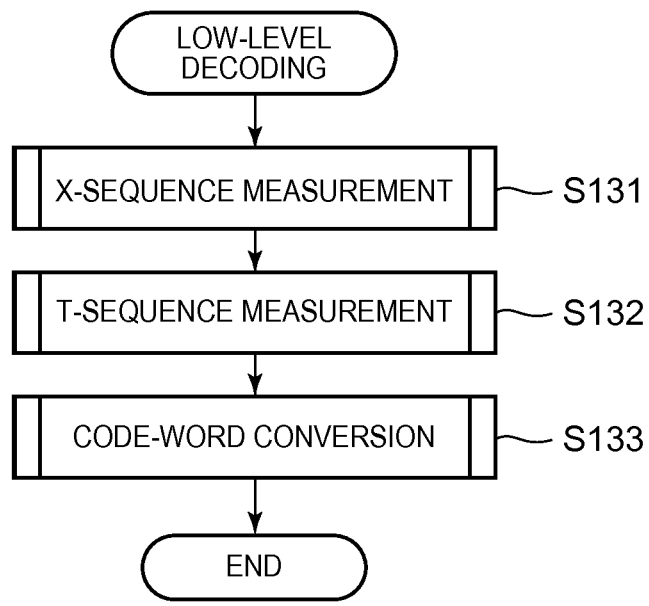
FIG. 11 is a flowchart showing a workflow of low-level decoding in the flowchart shown in FIG. 5.

FIG. 11 is a flowchart showing a workflow of low-level decoding (Step S36) in the flowchart shown in FIG. 5.

As shown in FIG. 11, a low-level decoding step includes X-sequence measurement, T-sequence measurement, and a code-word conversion; wherein, with respect to scanning reflection characteristics of each row of the stack barcode 21, a segment (i.e., a scanning reflectance rate waveform) having column boundaries determined by the column analysis as its both ends is taken out; a series of numerical values called X-sequence formed with an array of line width of bars and spaces constituting one column is obtained, in the X-sequence measurement; a series of numerical values called T-sequence is obtained by way of summing two neighboring bars and one space of the X-sequence, while these elements being shifted one by one, in the T-sequence measurement; and a code-word corresponding to each T-sequence is determined with reference to a code-word conversion table prepared in advance, in the code-word conversion.

(X-Sequence Measurement in Low-Level Decoding)

In PDF417 that is a kind of the stack barcode 21, two decoding steps, i.e., a low-level decoding step and a high-level decoding step, are carried out. In the low-level decoding step, code-words constituting a data column, which include a line width of each bar and a line width of each space, are once converted into intermediate information expressed with 929 codes that are numbered with numerals of 0 to 928. Then, in the high-level decoding step, after the code-words are once converted into the intermediate information expressed with 929 codes, the intermediate information is decoded into a final language, on the basis of a predetermined rule. As the final language, for PDF417, there are ASCII characters, binary expressions, other characters, and the like.

In FIG. 11, at first, the X-sequence measurement unit 14 of the low-level decoding unit 13d1 carries out an X-sequence measurement step (Step S131). In an ordinary X-sequence measurement step, for each row, the line width measurement means 14b of the X-sequence measurement unit 14 scans a line waveform as a result of averaging a plurality of lines 'L's included in the row, in order to carry out a line width measurement for obtaining a line width of each bar and a line width of each space; and then converts the line width expressed with the number of pixels into expression with the number of modules so as to obtain X-sequence. Incidentally, scanning lines are, for example, a plurality of lines 'L's formed almost in a center part of each row in the direction of rows; and in other words, bring in a matrix of pixels including a plurality of rows. Moreover, an average of brightness values of pixels constituting the plurality of lines 'L's is calculated; and the averaged brightness value of pixels is used for the decoding process, as a scanning reflectance rate waveform, representing the brightness value of pixel in the row.

FIG. 12 is a waveform diagram showing a part of a scanning reflectance rate waveform that represents a brightness value of a pixel, obtained as a result of scanning a line waveform by way of averaging a plurality of lines 'L's included in a certain row. Incidentally, a line width of each bar and a line width of each space are obtained by counting the number of pixels between a change point and a next change point in the scanning reflectance rate waveform representing a brightness value of a pixel. On this occasion, such a change point means a position where the scanning reflectance rate waveform representing a brightness value of a pixel intersects with a level of the predetermined threshold, which is not illustrated. PDF417, as a kind of coding scheme of the stack barcode 21, is composed of five columns; i.e. the start pattern, the left row indicator, the data column, the right row indicator, and the stop pattern, as shown in FIG. 3 and so on. Moreover, every column except the stop pattern is composed of four bars and four spaces, and therefore eight line width values in total are obtained in the column as far as the scanning reflectance rate waveform representing a brightness value of a pixel has no damage.

On the other hand, if the scanning reflectance rate waveform representing a brightness value of a pixel includes an error, eight or more line width values (for example, nine line width values) in total are obtained. In such a case, it is recognized that the column has damage, and a flag for notifying of poor reliability of the column is set. After executing these processes with respect to all columns included in a row, the same processes are repeated with respect to a next row. Then, having obtained line width data of all rows, the X-sequence measurement step of Step S131 (refer to FIG. 11) finishes.

(T-Sequence Measurement in Low-Level Decoding)

Next, the T-sequence measurement unit 15 of the low-level decoding unit 13d1 carries out a T-sequence measurement step (Step S132).

Concretely, the sequence conversion means 15a of the T-sequence measurement unit 15 converts an X-sequence into a T-sequence, in which two neighboring X-sequences, $X_i$ and $X_{i+1}$ are summed up. When the X-sequence of the left side column (data column) shown in FIG. 12 is converted into a T-sequence, a line width array is obtained as [6 (5+1), 2 (1+1), 2 (1+1), 2 (1+1), 2 (1+1), 6 (1+5), 7 (5+2)].

Next, the line width normalization means 15b of the T-sequence measurement unit 15 carries out a line width normalization process. In the line width normalization process, the line width expressed with the number of pixels, describing the measured line width of bars and spaces, is converted into expression with the number of modules. One module corresponds to a minimum width of a bar or a space. Concretely, in PDF417 as a kind of the stack barcode 21, one column including the data column is composed of 17 modules. Wherein each line width in one column being W1, W2, W3, W4, W5, W6, W7, & W8, and Wc=W1+W2+W3+W4+W5+W6+W7+W8; normalization line width is given as an X-sequence expressed with $X_i=W_i*17/W_c$ (i=1, 2, - - - 7, & 8). For example, the X-sequence of the left side column (data column) shown in FIG. 12 is a line width array described as [5, 1, 1, 1, 1, 1, 5, 2] (a sum total of these values is 17, and namely it means 17 modules).

Then, the judgment means 15c of the T-sequence measurement unit 15 makes a judgment on whether or not a cluster number calculated according to the T-sequence, which has been normalized with respect to line width, is consistent with a theoretical value.

(Code-Word Conversion in Low-Level Decoding)

Finally, the code-word conversion unit 16 of the low-level decoding unit 13d1 carries out code-word conversion (Step S133). More specifically, the code-word conversion table is read out of the table memory 16a where the code-word conversion table is stored, and a code-word corresponding to the T-sequence obtained at Step S132 is obtained, by referring to the table memory 16a. In other words, the low-level decoding step is carried out in such a way that code-words constituting a column, which include line width of four bars and line width of four spaces, are once converted into intermediate information expressed with 929 codes that are numbered with numerals of 0 to 928.

Incidentally, in this first embodiment, a most appropriate X-sequence can be selected out of a plurality of X-sequences obtained by means of a threshold method and a secondary differentiation method, at the X-sequence measurement step (Step S131).

(Threshold Method)

Figure 14:
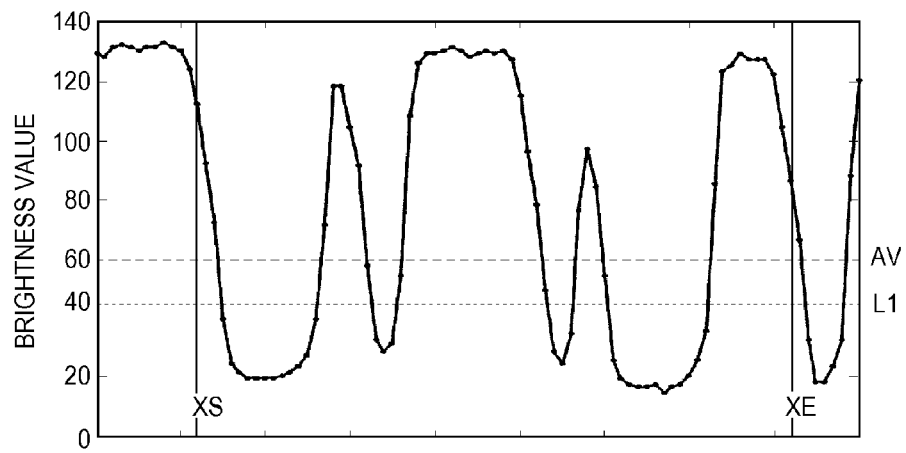
FIG. 14 is a diagram showing part of a scanning reflectance rate waveform that represents a brightness value of a row of a stack barcode.

FIG. 14 is a diagram showing a part of a scanning reflectance rate waveform that represents a brightness value of each pixel, obtained by way of scanning a line waveform as a result of averaging a plurality of lines 'L's included in a certain row; and the diagram corresponds to a certain row and a certain column of the stack barcode 21. Depending on whether a brightness value of each pixel is higher or lower than a first (constant) threshold AV, it is judged whether a spot of the pixel is a bar or a space. Concretely, if the total number of bars and spaces between a start point XS and an end point XE in a column is eight, the X-sequence is valid. In the case of FIG. 14, an X-sequence (including width of each bar and width of each space) is measured on the basis of the first (constant) threshold AV, and consequently a line width array shown as an X-sequence [12, 6, 3, 18, 3, 4, 12, 11] is obtained. On this occasion, the first (constant) threshold AV is an average value of all image data including line width of bars and spaces obtained by way of scanning an averaged line waveform, with respect to a certain column in a certain row. Concretely, in the row and the column shown in FIG. 14, brightness values of all the measured pixels are summed up, and the sum is divided by the number of all pixels so as to have the averaged brightness value per pixel (constant) as the (constant) threshold AV. Therefore, the first (constant) threshold AV is a constant value, as shown in FIG. 14. In this way, the first (constant) threshold AV can be calculated by means of one step, and it is possible to shorten the process time.

(n-Th Differentiation Method)

Figure 15:
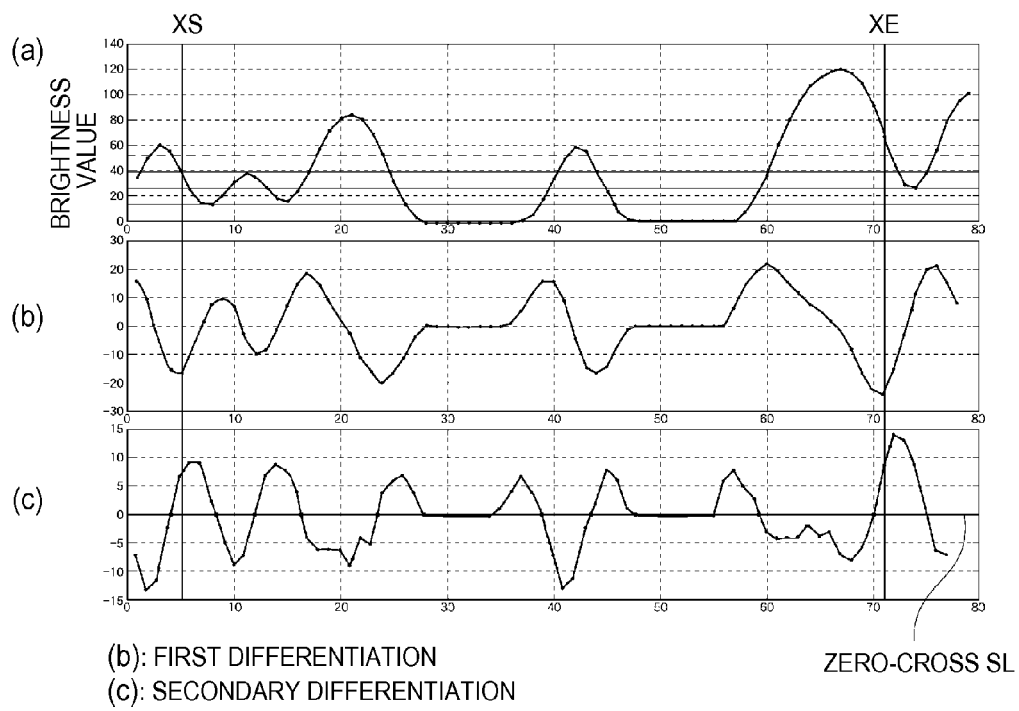
FIG. 15 shows diagrams for explaining an n-th differentiation method.

FIG. 15 shows diagrams for explaining an n-th differentiation method. FIG. 15(a) is a diagram showing a part of a scanning reflectance rate waveform that represents a brightness value of each pixel, obtained by way of scanning a line waveform as a result of averaging a plurality of lines 'L's included in a certain row. FIG. 15(b) is a waveform diagram showing a difference of brightness value obtained by way of a first differentiation on the scanning reflectance rate waveform shown in FIG. 15(a). FIG. 15(c) is a waveform diagram showing a difference of brightness value obtained by way of a further differentiation (a secondary differentiation) on the waveform of FIG. 15(b).

In the secondary differentiation method, a secondary differentiation is conducted on the scanning reflectance rate waveform representing a brightness value of each pixel so as to obtain a secondary differential value, and then a zero-cross point of the secondary differential value (namely, an inflection point of the initial waveform) is defined as a boundary between a bar and a space. Being compared with a method of detecting a waveform peak, which is likely affected by a resolution factor, such as the threshold method; the secondary differentiation method has an advantage of being a simple process, because a boundary between a bar and a space is obtained by calculating an inflection point in the waveform. Incidentally, a resolution of the scanning reflectance rate waveform shown in FIG. 15(*a*) is lower, being compared with a resolution of the scanning reflectance rate waveform shown in FIG. 14.

(X-Sequence Measurement Step)

Figure 13:
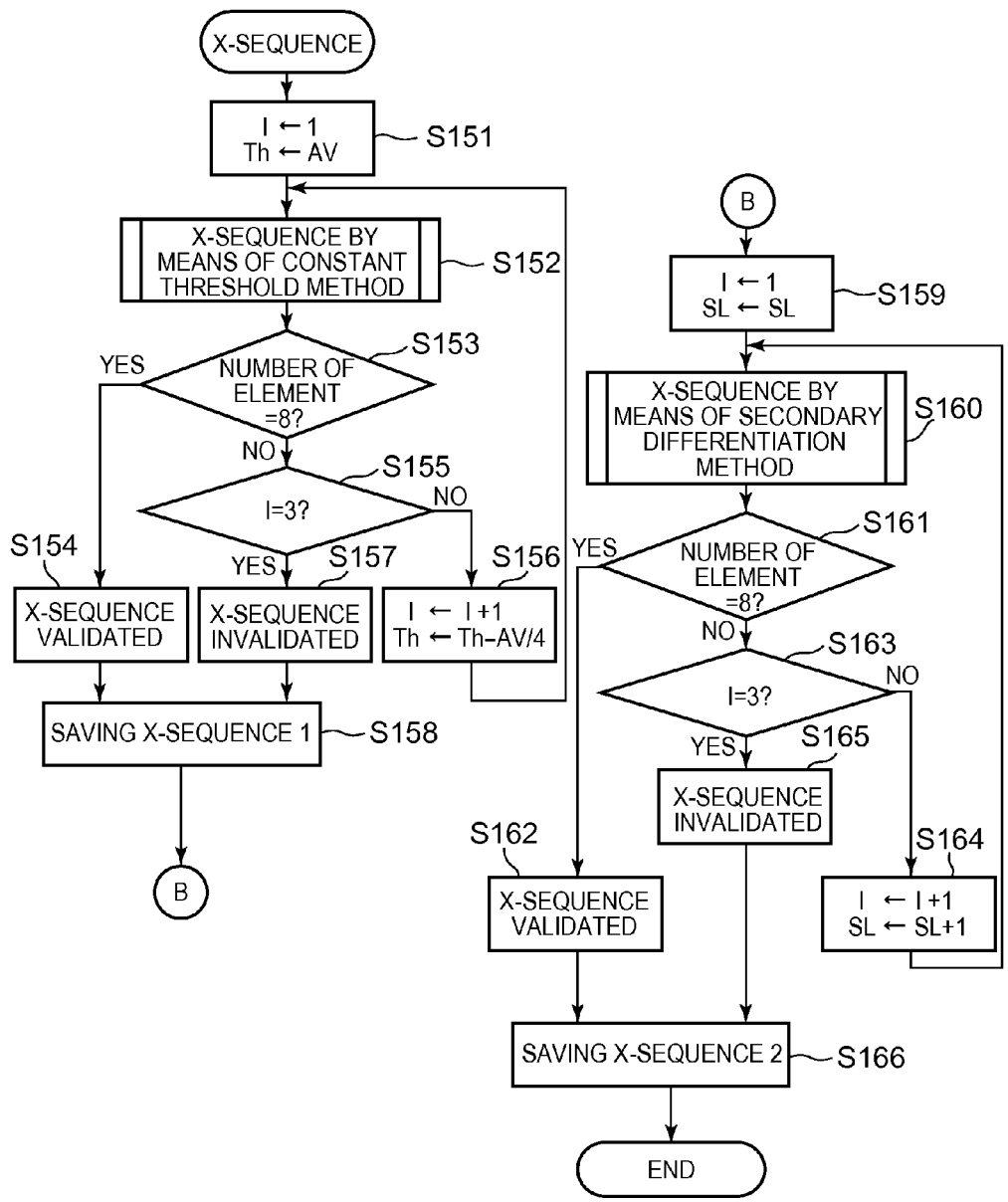
FIG. 13 is a flowchart showing a workflow of an X-sequence measurement process.

FIG. 13 is a flowchart showing a workflow of an X-sequence measurement step (Step S131 shown in FIG. 11). As described above, in the X-sequence measurement step, if a brightness value of each pixel, measured by way of scanning a line waveform as a result of averaging a plurality of lines 'L's included in a certain row, is higher than a predetermined threshold Th, it is judged that a spot of the pixel is a space. In the meantime, if the brightness value of the pixel is lower than the threshold Th, it is judged that the spot of the pixel is a bar. In this way, a judgment on whether it is a bar or a space is made. Furthermore, according to a judgment in a similar way, a width of a bar and a width of a space are measured in order to create line width data. A data column of the stack barcode 21 is composed of four bars and four spaces so that the total number of bars and spaces is eight. Therefore, the measurement step is repeated until the number of line width units becomes eight, while changing the threshold Th; the line width units being formed between side-by-side intersections of the scanning reflectance rate waveform and the constant threshold AV.

In this first embodiment, at first the constant threshold calculation means 14$a$1 obtains an X-sequence by means of the (constant) threshold method (from Step S151 to Step S158), as shown in FIG. 13.

Namely, at a time of I=1, a first constant threshold AV is set as the threshold Th (Step S151). Incidentally, an explanation of the constant threshold AV is described later.

Next, an X-sequence at a time of a first (constant) threshold Th=AV is measured (Step S152), and then it is judged whether or not the total number of bars and spaces at the time is eight (Step S153). If it is judged at Step S153 that the total number is eight, the X-sequence measurement is considered to be successful, and the X-sequence at the time is validated (Step S154) and it is saved as X-sequence 1 (Step S158). Meanwhile, if it is judged at Step S153 that the total number is not eight, it is further judged whether operation has been repeated for the specified number of times T (which is an integer equal to or greater than two), for example, whether or not the number of operation times has reached I=3 (Step S155).

At Step S155, if it is judged that 'I' is not three, the specified number of times 'I' is incremented by one, and moreover a second (constant) threshold Th is set by way of subtracting AV/4 from the first (constant) threshold Th (Step S156), and then operation of Step S152 and Step S153 is repeated. Incidentally, a symbol L1 in FIG. 14 represents an n-th (constant) threshold Th set by way of subtracting AV/4 from the 'n−1'-th (constant) threshold Th. Meanwhile, 'AV/4' is a value specified according to a rule of thumb, and this invention is not limited to the value.

By using the second (constant) threshold Th, which has been newly set, an X-sequence is measured again (Step S152); and if the total number is judged to be eight, the X-sequence is validated (Step S154). In the meantime, if the total number is not judged to be eight, T is incremented by one because T is not three (Step S155), and then a third (constant) threshold Th is newly set by way of further subtracting AV/4 from the second (constant) threshold Th (Step S156). Then, by using the third (constant) threshold Th, an X-sequence is measured again (Step S152). In this first embodiment, if the total number is not judged to be eight even after repeating the operation for the specified number of times, 'I'=3, the X-sequence is considered to be invalidated (Step S157), and it is saved as X-sequence 1 (Step S158).

When the X-sequence measurement step by means of the (constant) threshold method finishes in this way, next the n-th differential value calculation means 14$a$3 obtains an X-sequence by means of the secondary differentiation method (from Step S159 to Step S166).

Namely, at a time of I=1, a zero-cross point SL is set (Step S159).

Next, an X-sequence at the time is measured (Step S160), and then it is judged whether or not the total number at the time is eight (Step S161). If it is judged at Step S161 that the total number is eight, the X-sequence measurement is considered to be successful, and the X-sequence at the time is validated (Step S162) and it is saved as X-sequence 2 (Step S166). Meanwhile, if it is judged at Step S161 that the total number is not eight, it is further judged whether operation has been repeated for the specified number of times 'I' (which is an integer equal to or greater than two), for example, whether the number of operation times has reached I=3 (Step S163).

At Step S163, if it is judged that 'I' is not three, the specified number of times 'I' is incremented by one, and the zero-cross point SL is incremented by one (Step S164), and then operation of Step S160 and Step S161 is repeated.

By using the zero-cross point SL newly obtained, an X-sequence is measured again (Step S160); and if the total number is judged to be eight, the X-sequence is validated (Step S162). In the meantime, if the total number is not judged to be eight, T is incremented by one because T is not three (Step S163), and then the zero-cross point (i.e., a line representing the zero-cross point) SL is incremented by one (Step S164) in order to calculate a second zero-cross point (i.e., a line representing the zero-cross point) SL2. Then, by using the second zero-cross point (i.e., a line representing the zero-cross point) SL2, an X-sequence is measured again (Step S160). In this first embodiment, if the total number is not judged to be eight even after repeating the operation for the specified number of times, 'I'=3, the X-sequence is considered to be invalidated (Step S165), and it is saved as X-sequence 2 (Step S166). Incidentally, although the number for increment is described as one, the number is not limited to the value.

(T-Sequence Measurement Step)

FIG. 16(*a*) and FIG. 16(*b*) are flowcharts showing a workflow of a T-sequence measurement step (Step S132 in FIG. 11) in this first embodiment. As shown in FIG. 16(*a*) and FIG. 16(*b*), after the X-sequence measurement step by means of the secondary differentiation method finishes, an X-sequence measurement step by means of the constant threshold method is executed. In other words, results by the X-sequence measurement steps of the two methods are stored in the present embodiment.

In the T-sequence measurement step, the sequence conversion means 15$a$ of the T-sequence measurement unit 15 converts X-sequence 1 (the X-sequence obtained by means of the constant threshold method) and X-sequence 2 (the X-sequence obtained by means of the secondary differentiation method) individually into a T-sequence. The line width normalization means 15$b$ of the T-sequence measurement unit 15 normalizes line width of each T-sequence. Then, the judgment means 15$c$ of the T-sequence measurement unit 15 makes a comparison between a cluster number calculated according to each T-sequence and a theoretical value of a cluster number. Then, if both of them are the same each other, the T-sequence is validated; and if both of them are not the same each other, the T-sequence is invalidated.

Incidentally, the cluster number is prepared in the stack barcode 21 shown in FIG. 3, for the purpose of minimizing a probability of an occurrence of an error, and the cluster number exists in every code-word except the start pattern and the stop pattern. Concretely, according to the standards of PDF417, a cluster number sequentially appears once every three rows in a repetitive manner; namely, a cluster number "0", a cluster number "3", and a cluster number "6" are used for Row 1, Row 2, and Row 3, respectively. In other words, these cluster numbers "0", "3", and "6" are theoretical values of the cluster number.

Next, operation is explained by using concrete numerical values.

At first, X-sequence 2 obtained by means of the secondary differential differentiation method is taken out (Step S171) for converting it into a T-sequence (Step S172). In the T-sequence, two neighboring elements, $X_i$ and $X_{i+1}$ out of $X=[X_i, X_{i+1}, X_{i+2}, ---]$ are summed up. In the case of X-sequence 2 obtained by means of the secondary differentiation method, X=[12, 5, 5, 16, 4, 4, 12, 10] is measured according to the scanning reflectance rate waveform, for example, shown in FIG. 15(c). Then, converting the X-sequence into a T-sequence brings in a line width array that is shown as T=[17, 10, 21, 20, 8, 16, 22].

Next, on the basis of the T-sequence, a cluster number is calculated (Step S173). For calculation of a cluster number, at first the T-sequence is normalized according to $TN(i)=T(i)*17/Wc$ (i=0, 1, ---, 7). In the case of the example shown above, obtained is a line width array such as TN=[4, 3, 5, 5, 2, 4]. Then, a cluster number 'K' is calculated according to a formula expressed as: Cluster number 'K'=(TN(0)−TN(1)+TN(4)−TN(5)+9) mod 9 (wherein, "mod 9" means a reminder after dividing by 9). In the case of the example shown above, K=(4−3+2−4+9) mod 9=8 is obtained.

Next, it is judged whether or not the cluster number calculated at Step S173 is equal to a theoretical value of a cluster number corresponding to the row in process (Step S174). When the row in process is a first row of the stack barcode 21, a theoretical value of a cluster is "0". Therefore, the cluster number "8" is not consistent with the theoretical value of the cluster number "0", so that the T-sequence is invalidated (Step S176). On the other hand, if the cluster number is consistent with the theoretical value, the T-sequence is validated (Step S175), and it is saved as T-sequence 2 (Step S177).

After the X-sequence measurement step by means of the secondary differentiation method finishes in this way, subsequently an X-sequence measurement step by means of the (constant) threshold method is executed.

Figure 16A:
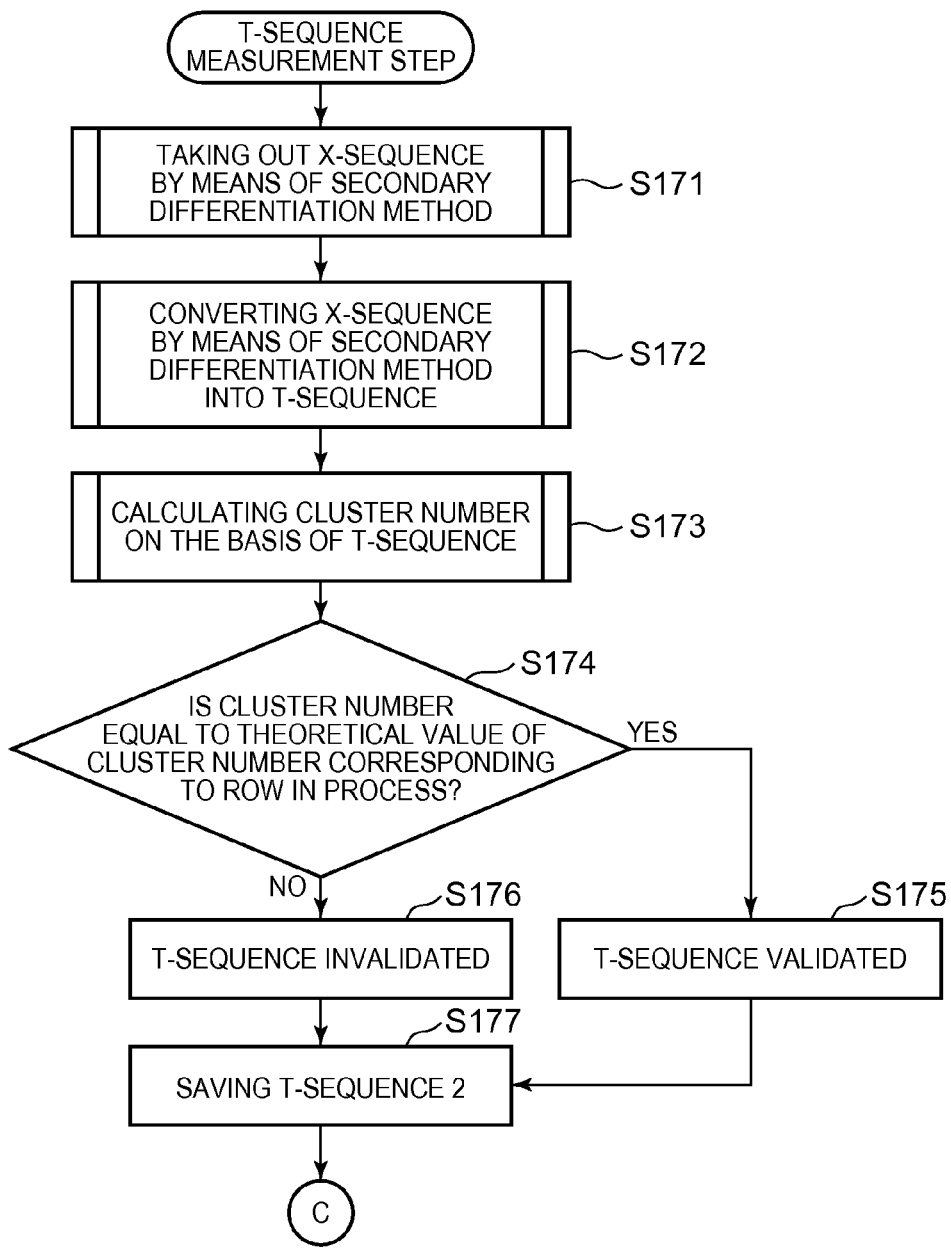
FIG. 16($a$) is a flowchart showing a workflow of a T-sequence measurement process.
Figure 16B:
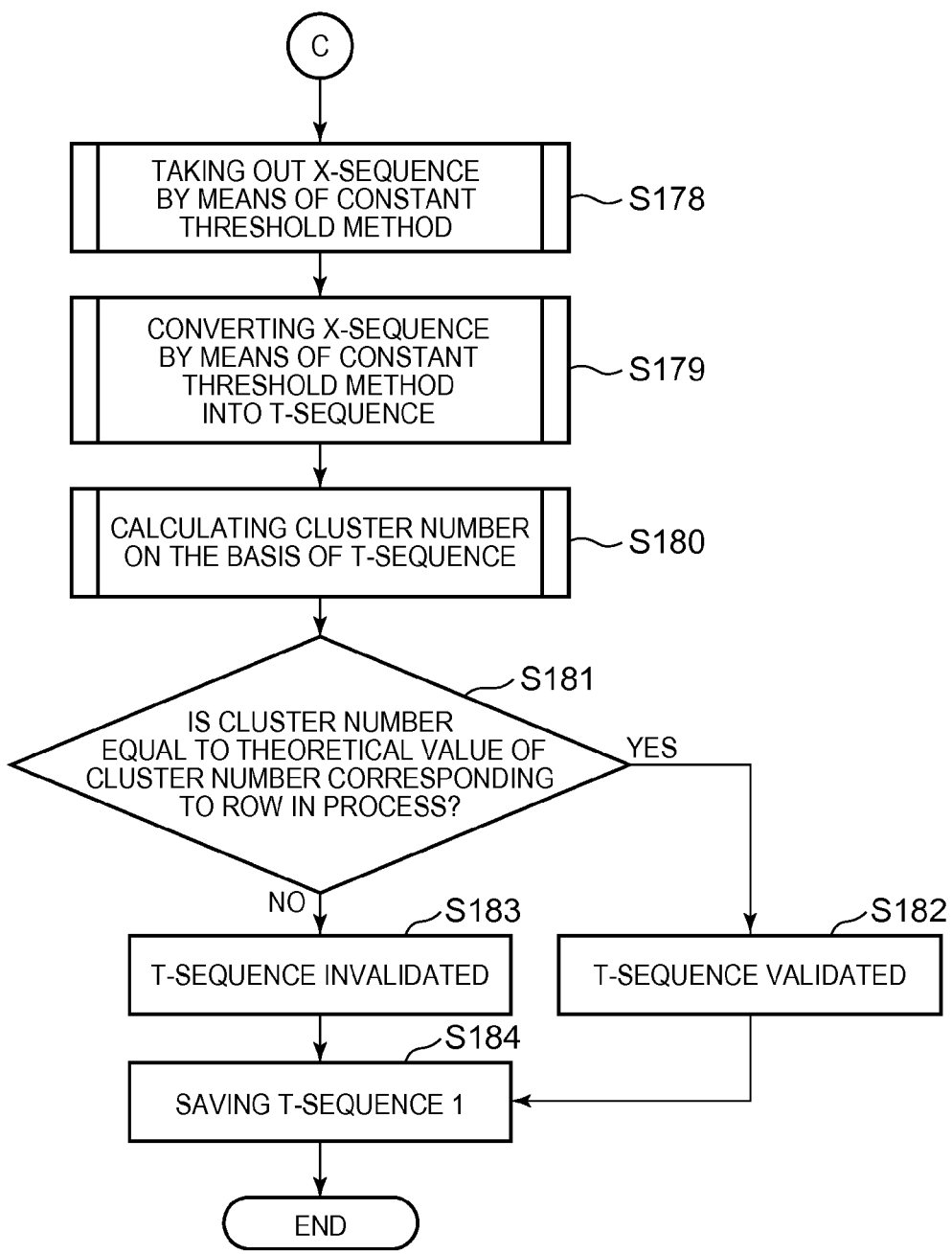

In FIG. 16b, X-sequence 1 obtained by means of the (constant) threshold method is taken out (Step S178) for converting it into a T-sequence (Step S179). In the case of X-sequence 1 obtained by means of the (constant) threshold method, X=[12, 6, 3, 18, 3, 4, 12, 11] is measured according to the scanning reflectance rate waveform, for example, shown in FIG. 14. Then, converting the X-sequence into a T-sequence brings in T=[18, 9, 21, 21, 7, 16, 23].

Next, on the basis of the T-sequence, a cluster number is calculated (Step S180). In the case of the example shown above, normalization brings in TN=[4, 2, 5, 5, 2, 4], and K=(4−2+2−4+9) mod 9=0 is obtained.

Next, it is judged whether or not the cluster number calculated at Step S180 is equal to a theoretical value of a cluster number corresponding to the row in process (Step S181). In the case of the example shown above, the cluster number "0" is consistent with the theoretical value of the cluster number "0", so that the T-sequence is validated (Step S182). On the other hand, if the cluster number is not consistent with the theoretical value, the T-sequence is invalidated (Step S183), and it is saved as T-sequence 1 (Step S184).

As described above, this first embodiment includes two kinds of low-level decoding methods; namely, the constant threshold method and the secondary differentiation method. By using these methods separately according to a level of resolution of an optical imaging system, a most appropriate X-sequence (X-sequence 1 or X-sequence 2) and a most appropriate T-sequence (T-sequence 1 or T-sequence 2) can be obtained even though the scanning reflectance rate waveform of the stack barcode 21 fluctuates.

After obtaining an appropriate X-sequence and an appropriate T-sequence, a low-level decoding step is carried out, and a code-word conversion process (Step S133 in FIG. 11) is carried out. Concretely to describe, with respect to each of saved T-sequence 1 and T-sequence 2, a code-word corresponding to each T-sequence is obtained from a predetermined conversion table. In other words, the low-level decoding step is carried out in such a way that code-words constituting a column, which include line width of four bars and line width of four spaces, are once converted into intermediate information expressed with 929 codes that are numbered with numerals of 0 to 928.

(High-Level Decoding)

After the code-word conversion finishes, commonly-used high-level decoding is carried out (Step S37 in FIG. 5) and the decoding process finishes.

FIG. 20 is a block diagram showing a high-level decoding unit of a stack barcode reader according to this first embodiment. FIG. 21 is a flowchart showing a workflow of high-level decoding in the flowchart shown in FIG. 5.

The high-level decoding unit 13d2 includes an error-correction unit 17a and a data decoding unit 17b.

(1) At first, an error-correction step is executed, with respect to data for which code-word conversion has been carried out on the basis of the T-sequence result obtained by means of the secondary differentiation method (Step S141).

(2) The corrected data code-words are stored in a memory unit.

(3) The number of error-corrections (the number of errors) is counted, and the number of errors is stored in the memory unit.

Incidentally, if the error-correction cannot be done at (1), operation finishes as decoding is impossible.

For a specific process by use of an error-correction code, a commonly-used method is applied in PDF417; and for example, a method disclosed in Japanese Unexamined Patent Application Publication No. H8-255208 can be used.

(4) Next, an error-correction step is executed, with respect to data for which code-word conversion has been carried out on the basis of the T-sequence result obtained by means of the constant threshold method.

(5) The corrected data code-words are stored in the memory unit.

(6) The number of error-corrections (the number of errors) is counted, and the number of errors is stored in the memory unit.

Incidentally, if the error-correction cannot be done at (4), operation finishes as decoding is impossible.

Then, a data decoding step is executed (Step S142).

Incidentally, as described above; the stack barcode 21, namely PDF417 of the present embodiment, is structured with a plurality of stacked stages of data code-words in which white spaces and black bars are placed between the start pattern (code-word) and the stop pattern (code-word), positioned at both the right and left sides. Meanwhile, one code-word included in the data code-words, in the case of PDF417, is composed of four spaces and four bars; and the total number of modules for the four spaces and four bars is 17 modules.

Data code-words, for which the decoding step is complete and a data correction is made, are output together with stack barcode information and the like, to a higher-level control device. Concretely, in the high-level decoding; the code-words are decoded into a final language, on the basis of a predetermined rule, after the process described above (the low-level decoding). As the final language for PDF417, there are ASCII characters, binary expressions, other characters, and the like.

For the data decoding step, a commonly-used method is applied in PDF417; and for example, a method disclosed in Japanese Unexamined Patent Application Publication No. H3-204793 and Japanese Unexamined Patent Application Publication No. H5-290204 can be used.

To explain the error correction for more details, an error correction according to Reed-Solomon Coding is applied to the stack barcode 21. In the error correction according to Reed-Solomon Coding; an error correction code, taking advantage of a code theory that is able to restore data even if the original data is partially damaged, is added to the original data, and the error correction code is placed in a data area. Accordingly, even when a position of the code has a blot or a defective part, the original data can be restored.

In the stack barcode reading method according to the present embodiment, information on an error correction can also be output by use of a popularly-known algorithm for error correction.
(1) On the basis of the data obtained from the stack barcode, a syndrome calculation is carried out. Wherein, a syndrome is an operator for detecting a presence of an error. In the case of no error, every syndrome value is zero.
(2) A variable for an error position polynomial equation is calculated.
(3) An error position is detected by way of solving the error position polynomial equation.
(4) An error value corresponding to the error position is calculated.
(5) The error is corrected by subtracting the value corresponding to the error position out of the error position.

To explain further more in detail, with respect to a code-word judged to be a failure (error) owing to a blot or a defective part of the stack barcode 21, data decoded by use of the error correction data is written in the stack barcode 21.

Explained here are a structure of the stack barcode 21, an estimation of a failure, an error correction method in the case of having a failure. First, as shown in FIG. 3 and FIG. 18, the stack barcode 21 has a two-dimensional extent.

In the stack barcode reader 1; if a captured image of the stack barcode 21 has a failure, an error correction is carried out by using error correction data included in the stack barcode 21. In this context, the failure of the image means a situation where part of the image of the stack barcode 21 cannot adequately be read because of a blot or damage of the stack barcode 21 itself.

In general, an error correction code having an advanced correction capability is used for the stack barcode 21. As shown in FIG. 18, the stack barcode 21 is divided into a data code area and an error correction area, which are Reed-Solomon-coded. Incidentally, an error correction block is a redundant datum for RS coding. Meanwhile, a data block and an error correction block are each configured with information called a code-word as a unit, while the code-word being composed of 17 modules of four bars and four spaces. Then, the error correction area includes at least two error detection code-words C0 and C1. These two error detection code-words collectively form an inspection total having a length of two code-words. The stack barcode 21 (PDF417) is able to code data by way of providing an error correction capability.

Such a commonly-used error correction for the stack barcode 21 is explained below more in detail. For an error correction, there exist two types of methods; namely, a detection/correction method and an erasure correction method. The detection/correction method is mainly composed of three steps as described below:
(1) To calculate a syndrome polynomial equation according to a code.
(2) To calculate an error position polynomial equation and an error numerical polynomial equation according to the syndrome polynomial equation.
(3) To calculate an error position by means of the chain-search method according to the error position polynomial equation, and calculate a scale (error pattern) of the error at the position for the error-correction.

In the case of an example of the stack barcode 21, a syndrome polynomial equation is calculated according to a coding block, and an error position polynomial equation and an error numerical polynomial equation are calculated according to the syndrome polynomial equation. Then, a code-word as an error position is identified according to the error position polynomial equation, and a scale of the error of the code-word is calculated for the error correction.

Meanwhile, in the erasure correction method, it is presumed that a code position with an error (erasure position), namely a code-word having the error, is known beforehand, and then only a scale of the error is calculated for the error correction. The erasure correction method is mainly composed of three steps as described below:
(1) To calculate a syndrome polynomial equation according to a code.
(2) To correct the syndrome polynomial equation by using an erasure polynomial equation obtained according to the erasure position, and calculate an erasure numerical polynomial equation.
(3) To calculate a scale of the error at the erasure position for the error-correction.

As described above, in the erasure correction method, only a scale of the error is calculated on the assumption that an error position is already known. Therefore, being different from the case of the detection/correction method, a polynomial equation to be calculated according to the syndrome polynomial equation is only the erasure numerical polynomial equation. As a result, a correction capability becomes two times as much that of the detection/correction.

Although a method based on the Reed-Solomon Coding described above is popularly used for the error correction in this way, it may also be possible to carry out an erasure correction, while adding a parity (an error detection code) and detecting an error position according to the parity, in order for improvement of the correction efficiency. Moreover, a white space and a black bar are placed alternately in the case of the stack barcode 21; and therefore, the detection/correction process can be carried out while estimating that a code-word block including only white spaces or black bars is a failure, on this premise.

(Decoded Result Selection)

FIG. 22 is a block diagram showing a decoded result selection unit of the stack barcode reader according to the first embodiment. FIG. 23 is a flowchart showing a workflow of a decoded result selection.

The decoded result selection unit 13d3 includes a counter 18a and a selection unit 18b.

At first, 'n' is set with '1' (Step S191). Low-level decoding is carried out by way of an 'n'-th threshold calculation means to obtain a code-word set CW(n) (Step S192).

Then, high-level decoding is carried out by using the code-word set CW(n) to obtain the number of error-corrected code-words EC(n) (Step S193).

If it is judged at Step S194 that 'n' is not equal to 'N', 'n' is incremented by one (Step S195). Then, Step S192 and Step S193 are repeated until 'n' becomes equal to 'N'. Wherein, 'N' is the number of threshold calculation means 14a. In the present embodiment, a secondary differential value calculation means and a constant threshold calculation means are used as the threshold calculation means 14a, and therefore 'N' is equal to two.

If it is judged at Step S194 that 'n' is equal to 'N', a decoded result corresponding to an 'n' for providing Min (EC(n)) is adopted as a final result (Step S196).

In the present embodiment, for selecting a decoded result, the numbers of error-corrections (the numbers of errors) calculated at item (3) and item (6) in the high-level decoding described above are compared with each other to select a method having a less number of error-corrections. In other words, a result of the data decoding step by way of the selected method is indicated as a final result.

Incidentally, in the case where either of item (3) or item (6) described above cannot be corrected, the method by which the correction cannot be made is dealt with as being unable to decode, and operation finishes. Accordingly, the result from the method by which the correction can be made is indicated as a final result. Moreover, in the case where neither item (3) nor item (6) described above can be corrected, both the methods are dealt with as being unable to decode, and operation finishes.

(Primary Advantageous Effect of the Present Embodiment)

According to the present embodiment, the decoding unit 13d obtains a boundary between a bar and a space by way of different means. The decoding unit 13d carries out low-level decoding and high-level decoding, in order to decode the stack barcode 21 into character information, and eventually the decoded result selection unit 13d3 can select a decoded result having a less number of error-corrections. Even among decoded data, there exists variation in reliability of the data. Then, it is possible to evaluate the variation in a quantitative way so that a more highly-accurate decoding process can be carried out.

Furthermore, as described above; since the decoded result selection unit 13d3 selects a decoded result having a less number of error-corrections, a most appropriate decoded result can be output as a final result, regardless of a resolution of a scanning reflectance rate waveform. Consequently, a decoding system with high reliability can be materialized.

Moreover, as explained above, even in the case where a scanning reflectance rate waveform of the stack barcode 21 fluctuates, the stack barcode 21 can accurately be read in the present embodiment. Concretely, in the case where a resolution of an imaging optical system reaches a certain level, low-level decoding by means of the (constant) threshold method can be adopted, wherein a threshold is determined by way of detecting a peak value of the scanning reflectance rate waveform of the stack barcode 21. On the other hand, in the case where the resolution of an imaging optical system does not reach the certain level, the scanning reflectance rate waveform of the stack barcode 21 gets fluctuated so that it becomes difficult to accurately detect a peak value. Even under such a situation, low-level decoding by means of the secondary differentiation method can be adopted, wherein a change in output at an edge (boundary) part between a bar and a space can be extracted in the secondary differentiation method, with a high degree of accuracy by way of calculating a difference in brightness values.

As a result of that, it becomes possible to accurately read the stack barcode 21, while being unlikely affected by a fluctuation in the scanning reflectance rate waveform of the stack barcode 21.

Moreover, even in the case where a medium transfer speed is increased or decreased during imaging operation, applying the low-level decoding of both the methods (the (constant) threshold method and the secondary differentiation method) advantageously makes it easy to cope with the changing speed.

If a means for calculating a boundary between a bar and a space includes; for example, a first means (a constant threshold calculation means and/or a local threshold calculation means), which is effective when a resolution of a scanning reflectance rate waveform is relatively high, and a second means (an n-th differential value calculation means), which is effective when a resolution of a scanning reflectance rate waveform is relatively low, it is possible to make up the stack barcode reader 1 that has resistance to a fluctuation in scanning reflectance rate characteristics.

Moreover, the threshold calculation means 14a includes the constant threshold calculation means 14a1 and/or the local threshold calculation means 14a2 for calculating a threshold for measuring line width of a bar and a space of the stack barcode 21 by use of brightness values of a plurality of pixels constituting an image datum, and the n-th differential value calculation means 14a3 for calculating an n-th differential value (i.e., a first differential value or a secondary differential value) by way of differentiating a scanning reflectance rate waveform representing the brightness values of a plurality of pixels constituting the image datum.

According to the present embodiment, by including the constant threshold calculation means 14a1 or the local threshold calculation means 14a2 that is effective when a resolution of a scanning reflectance rate waveform, representing brightness values of a plurality of pixels constituting an image datum, is relatively high, and the n-th differential value calculation means 14a3 that is effective when the resolution of the scanning reflectance rate waveform is relatively low, it becomes possible to select a more appropriate decoded result even when the scanning reflectance rate waveform fluctuates. Therefore, the stack barcode reader 1 that has resistance to a fluctuation in scanning reflectance rate characteristics can be constructed.

In the present embodiment, the n-th differential value is a secondary differential value, and a boundary between the bar and the space is determined with a zero-cross point of the secondary differential value. In this way, while a boundary between the bar and the space being determined with a zero-cross point of the secondary differential value, a bar/space pattern can accurately be created by use of the scanning reflectance rate waveform, even when the resolution of the scanning reflectance rate waveform, representing brightness values of a plurality of pixels constituting an image datum, is relatively low.

Moreover, the constant threshold calculation means 14a1 calculates a constant threshold on the basis of an average value of the image datum, and meanwhile the local threshold calculation means 14a2 calculates a local threshold on the basis of an average value of a maximum peak value and a minimum peak value of a bar and a space, neighboring each other in the image datum. In this way, while a threshold being calculated on the basis of an overall average value or a local average value of the image datum, a processing speed can be increased by reducing a calculation load, when the resolution of the scanning reflectance rate waveform, representing the brightness values of a plurality of pixels constituting the image datum, is relatively high.

Furthermore, in the present embodiment, by including a threshold calculation process that is effective when a resolution of a scanning reflectance rate waveform, representing brightness values of a plurality of pixels constituting an image datum, is relatively high, and an n-th differential value calculation process that is effective when the resolution of the scanning reflectance rate waveform is relatively low, it becomes possible to select a more appropriate decoded result even when the scanning reflectance rate waveform fluctuates. Even among decoded data, there exists variation in reliability of the data. Then, it is possible to evaluate the variation in a quantitative way so that a more highly-accurate decoding process can be carried out.

Moreover, as described above; since the decoded result selection unit 13d3 selects a decoded result having a less number of error-corrections, a most appropriate decoded result can be output as a final result, regardless of a resolution of a scanning reflectance rate waveform. Consequently, a decoding system with high reliability can be materialized.

OTHER EMBODIMENTS OF THE INVENTION

Incidentally, explained in the first embodiment described above is a case for low-level decoding by the stack barcode reading method, where low-level decoding (Step S171 through Step S177) is carried out at first according to the X-sequence measurement step by means of the secondary differentiation method, and then low-level decoding (Step S178 through Step S184) is carried out according to the X-sequence measurement step by means of the (constant) threshold method, as shown in FIG. 16a and FIG. 16b. Alternatively, if required, the order of these steps may be changed in such a way that the low-level decoding on the basis of the X-sequence measurement step by means of the (constant) threshold method is carried out at first, and then the low-level decoding on the basis of the X-sequence measurement step by means of the secondary differentiation method is carried out.

Figure 17:
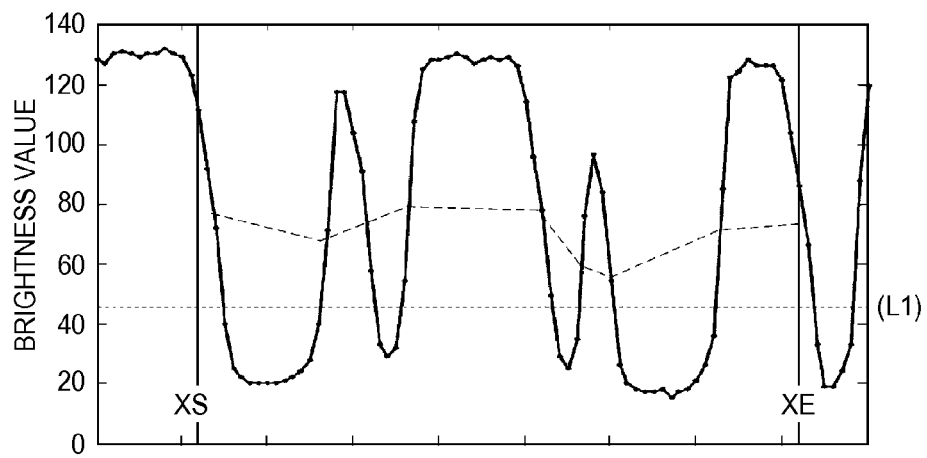
FIG. 17 is a diagram showing part of a scanning reflectance rate waveform that represents a brightness value of a row of a stack barcode, in a stack barcode reading method according to a modification example of the first embodiment of the present invention.

Moreover, explained in the first embodiment described above is a case for conducting the X-sequence measurement step of the stack barcode reading method, where the constant threshold method for calculating an average of brightness values of pixels constituting a scanning reflectance rate waveform is adopted as a threshold method. Alternatively, any threshold method (for example, a local threshold method and the like) other than the constant threshold method may be used as a substitute, or used together. When a local threshold method is adopted, the local threshold calculation means 14a2 of the X-sequence measurement unit 14 calculates a local threshold. In the local threshold method, a boundary between a bar and space is identified with a local threshold on the basis of an average value of a maximum peak value and a minimum peak value of a bar and a space, neighboring each other in the image datum as shown in FIG. 17. The local threshold method has an advantage that the method can detect line width of a bar and a space with better accuracy, being compared with the constant threshold method, even when a peak value variation arises owing to unevenness of brightness and a blot in a corrected image datum.

Moreover, explained in the first embodiment described above is a case for conducting the X-sequence measurement step of the stack barcode reading method, where the secondary differentiation method is adopted as an n-th differentiation method (namely, 'n-th' is 'secondary' in this case). Alternatively, instead of the secondary differentiation method, a first differentiation method (namely, 'n-th' is 'first' in this case) may be used as a substitute, or used together.

Furthermore, explained in the first embodiment described above is a case for the tilt correction with respect to the stack barcode (Step S33) in the stack barcode reading method, where image data of the stack barcode 21 is converted into corrected image data having a tilt angle of zero degrees. Alternatively, if it is assured that the image data of the stack barcode 21 is not tilted, or a countermeasure can be taken by another tilt correction means even though the image data of the stack barcode 21 is tilted, it is also possible to omit the tilt correction with respect to the stack barcode.

Moreover, although an explanation in the first embodiment described above is made with respect to the stack barcode 21, i.e., a type of two-dimensional barcode, at least an embodiment of the present invention can also be applied in the same manner to a one-dimensional barcode.

Furthermore, although at least an embodiment of the present invention is applied to a combination of a one-dimensional imaging element and a linear transfer mechanism, the present invention is not limited to this arrangement, and at least an embodiment of the present invention may be applied to, for example, a combination of an area sensor, such as a two-dimensional CCD and a CMOS imager, and a subject supporting mechanism.

INDUSTRIAL APPLICABILITY

At least an embodiment of the present invention can preferably be applied to a stack barcode reader in which a scanning reflectance rate waveform of a stack barcode is at risk of fluctuating because of a resolution level of an imaging optical system.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A stack barcode reader for use with a stack barcode, the stack barcode reader comprising:
    an imaging section configured to image the stack barcode in which character information is coded into a barcode so as to be expressed with a bar and a space;
    an image memory configured to store image data of the stack barcode imaged by the imaging section;
    a data processing section including a decoding unit and configured to decode the barcode of the stack barcode into the character information, on the basis of the image data;
    wherein the decoding unit includes a low-level decoding unit having a plurality of threshold calculation means for calculating a boundary between the bar and the space by different means; a high-level decoding unit for decoding the stack barcode into the character information by use of a code-word converted in the low-level decoding unit; and a decoded result selection unit for selecting a decoded result; and the high-level decoding unit includes an error-correction unit configured to execute an error-correction step; and the decoded result selection unit includes a counter unit configured to count the number of error corrections made in a code-word and storing it as the number of corrections; and a selection unit configured to select a decoded result having the less number of corrections by way of making a comparison of the numbers of corrections stored in the counter unit.

2. A stack barcode reading method comprising:

calculating a threshold for measuring line width of a bar and a space of a stack barcode by using brightness values of a plurality of pixels constituting image data, at a time of decoding a barcode of the stack barcode into character information, on the basis of the image data obtained by way of imaging the stack barcode in which the character information is coded into the barcode so as to be expressed with the bar and the space;

calculating an n-th differential value (a first differential value or a secondary differential value) by way of differentiating a scanning reflectance rate waveform representing the brightness values of the plurality of pixels constituting the image data;

measuring the line width of the bar and the space of the stack barcode, on the basis of the threshold and the n-th differential value;

measuring T-sequence according to the line width of the bar and the space of the stack barcode;

obtaining a code-word corresponding to the T-sequence; and decoding the stack barcode into the character information by use of the code-word, wherein the decoding the stack barcode comprises carrying out an error correction process:

counting the number of error corrections made in a code-word and storing it as the number of corrections; and selecting a decoded result having the less number of corrections by way of making a comparison of the numbers of corrections stored.

* * * * *